US009686317B2

(12) United States Patent
Pancorbo Marcos et al.

(10) Patent No.: US 9,686,317 B2
(45) Date of Patent: Jun. 20, 2017

(54) NETWORK NODE AND METHOD TO CONTROL ROUTING OR BYPASSING OF DEPLOYED TRAFFIC DETECTION FUNCTION NODES

(75) Inventors: Maria Belen Pancorbo Marcos, Madrid (ES); Louis Segura, Saint-Laurent (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 616 days.

(21) Appl. No.: 13/283,816

(22) Filed: Oct. 28, 2011

(65) Prior Publication Data
US 2012/0246325 A1    Sep. 27, 2012

Related U.S. Application Data

(60) Provisional application No. 61/466,372, filed on Mar. 22, 2011.

(51) Int. Cl.
*G06F 15/173* (2006.01)
*H04L 29/06* (2006.01)
*H04L 12/26* (2006.01)
*H04L 12/14* (2006.01)

(52) U.S. Cl.
CPC .......... *H04L 63/20* (2013.01); *H04L 12/1407* (2013.01); *H04L 12/2602* (2013.01); *H04L 63/102* (2013.01)

(58) Field of Classification Search
CPC ... H04L 12/2602; H04L 63/102; H04L 63/20; H04L 12/1407
USPC ......... 709/224, 227–229; 370/252, 328–329, 370/235; 455/404.1
See application file for complete search history.

(56) References Cited

U.S. PATENT DOCUMENTS

| | | | |
|---|---|---|---|
| 2010/0106845 A1* | 4/2010 | Hu et al. | 709/228 |
| 2011/0167471 A1* | 7/2011 | Riley et al. | 726/1 |
| 2012/0129488 A1* | 5/2012 | Patterson et al. | 455/406 |
| 2012/0220330 A1* | 8/2012 | Goldner et al. | 455/517 |
| 2012/0239816 A1* | 9/2012 | Carnero Ros et al. | 709/227 |

FOREIGN PATENT DOCUMENTS

WO    WO 2012045341 A2 *  4/2012
WO    WO 2012145902 A1 * 11/2012

OTHER PUBLICATIONS

Allot Communications, Service Awareness Alternative 1a Description SA WG2 Temporary Document, 3GPP TSG SA WG2 Meeting #78, Feb. 22-26, 2010.*
3GPP, 3rd Generation Partnership Project; Technical Specification Group Services and System Aspects; study on policy solutions and enhancements (release 10), 3GPP TR 23.813 v0.5.0 Feb. 2011.*

(Continued)

Primary Examiner — Hitesh Patel

(57) ABSTRACT

A network is described herein which can control, through subscriber profile data and/or policy preconfigured control data, whether deep packet inspection for data flow/s for an Internet Protocol-Connectivity Access Network (IP-CAN) session established by an end user should take place, or not, according to a defined "User Privacy Policy", and, in the former case, to which traffic detection function (TDF) node the data flow(s) should be directed.

25 Claims, 13 Drawing Sheets

(56) References Cited

OTHER PUBLICATIONS

Allot Communications, Service Awareness Alternative 1a Description SA WG2 Temporary Document, 3GPP TSG SA WG2 Meeting #78, hereinafter "3GPP TSG SA WG2".*
Allot Communications. Service Awareness Alternative 1a Description SA WG2 Temporary Document. 3GPP TSG SA WG2 Meeting #78. Feb. 22-26, 2010. TS S2-101305.
3GPP. $3^{rd}$ Generation Partnership Project, Technical Specification Group Services and System Aspects; Policy and Charging Control Architecture (Release 11) 3GPP TS 23.203 v11.0.1. Jan. 2011.
3GPP. $3^{rd}$ Generation Partnership Project Technical Specification Group Services and System Aspects; Study on Policy Solutions and Enhancements (Release 10). 3GPP TR 23.813 v0.5.0. Feb. 2011.
3GPP. 3rd Generation Partnership Project; Technical Specification Group Core Network and Terminals; Evolved Packet System (EPS); Mobility Management Entity (MME) and Servind GPRS Support Node (SGSN) Related Interfaces Based on Diameter Protocol (Release 9). 3GPP TS 29.272 v9.5.0. Dec. 2010.
38PP, $3^{rd}$ Generation Partnership Project; Technical Specification Group Services and System Aspects; General Packet Radio Service (GPRS); Service Description; Stage 2 (Release 10). 3GPP TS 23.060 v10.2.0. Dec. 2010.
3GPP. 3rd Generation Partnership Project; Technical Specitication Group Services and System Aspects; General Packet Radio Service (GPRS) Enhancements for Evolved Universal Terrestrial Radio Access Network (E-UTRAN) Access (Release 10). 3GPP. TS 23.401 v10.2.1. Jan. 2011.
3GPP. 3rd Generation Partnership Project; Technical Specitcation Group Core Network and Terminals; 3GPP Evolved Packet System (EPS); Evolved General Packet Radio Service (GPRS) Tunnelling Protocol for Control plane (GTPv2-C); Stage 3 (Release 10). 3GPP TS 29.274 GTPv2 v10.1.0. Dec. 2010.
3GPP, 3rd Generation Partnership Project; Technical Spedfication Group Core Network and Terminals; General Packet Radio Service (GPRS); GPRS Tunnelling Protocol (GTP) Across the Gn and Gp Interface (Release 10). 3GPP TS 29.060 GTPv1 v10.0.0. Dec. 2010.
$3^{rd}$ Generation Partnership Project; Technical Specification Group Core Network Terminals; Policy and Charging Control over Gx reference point (Release 10) 3GPP TS 29.212 v10.1.0 (Dec. 2010).

* cited by examiner

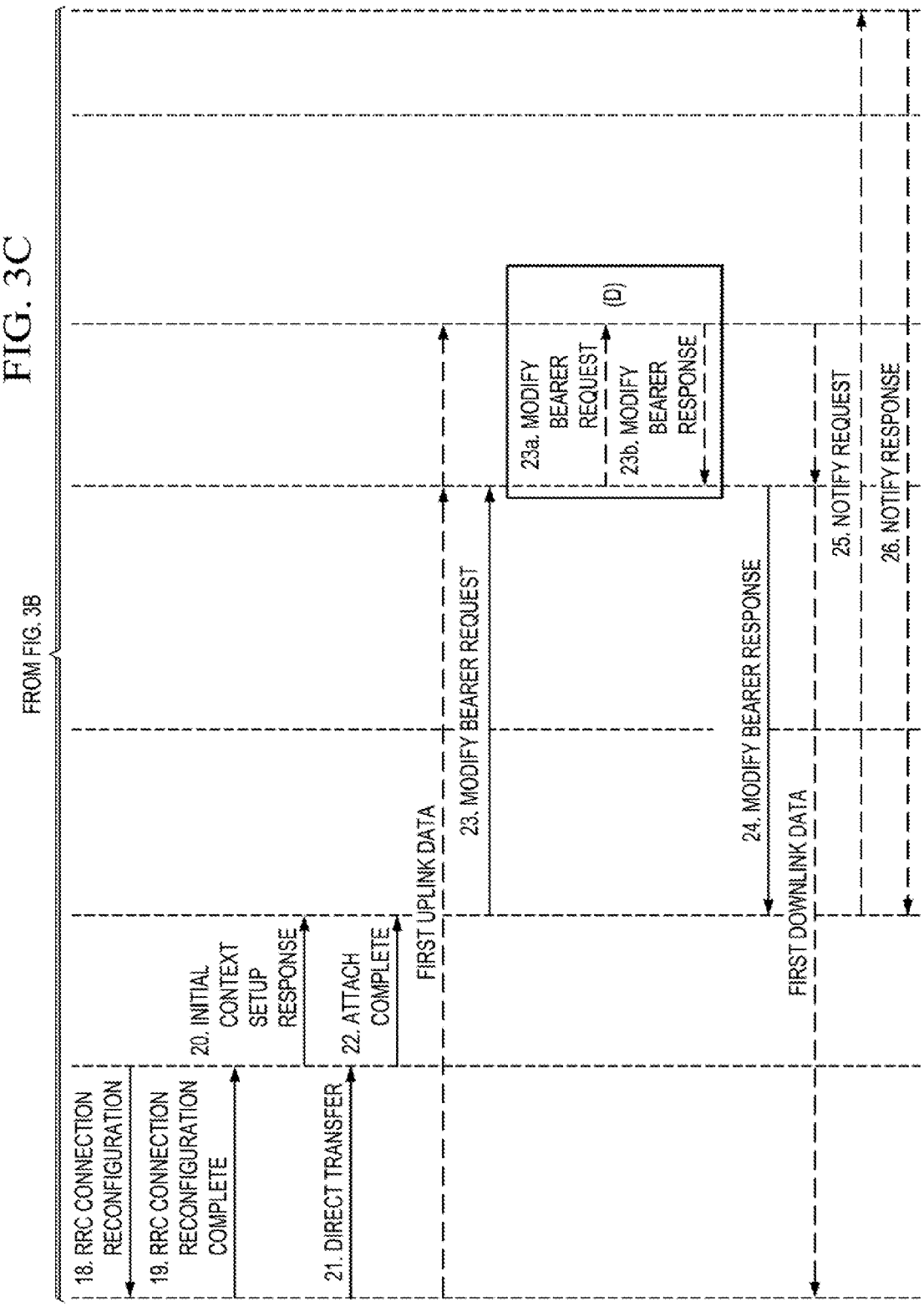

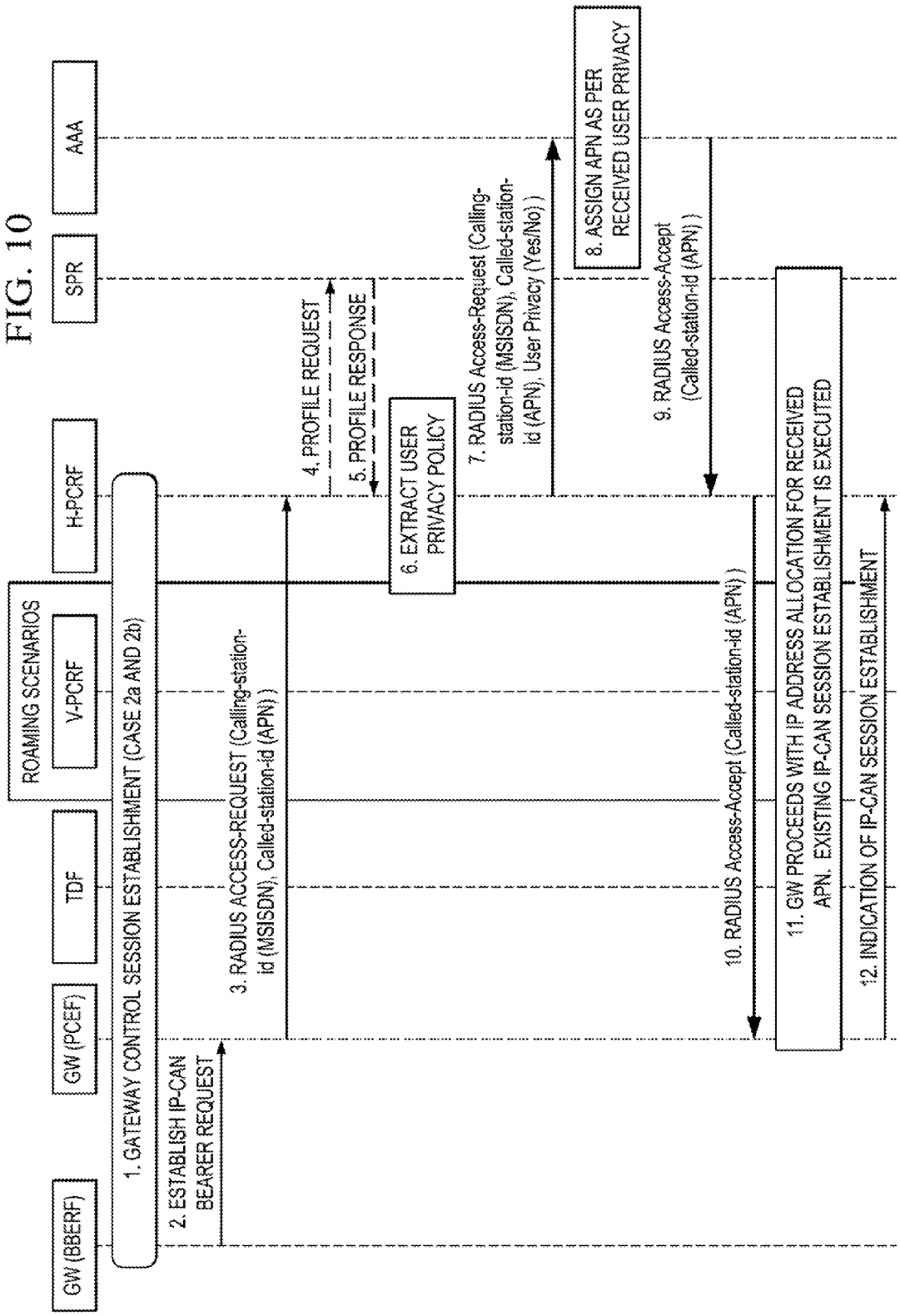

NETWORK NODE AND METHOD TO CONTROL ROUTING OR BYPASSING OF DEPLOYED TRAFFIC DETECTION FUNCTION NODES

RELATED APPLICATIONS

This application claims the benefit of International Application No. PCT/IB2011/054788, filed Oct. 26, 2011, and U.S. Provisional Application Ser. No. 61/466,372 filed on Mar. 22, 2011. The contents of this document are hereby incorporated by reference herein.

TECHNICAL FIELD

The present invention relates to a network node and a method for participating in an Internet Protocol-Connectivity Access Network (IP-CAN) session establishment to control routing of data flows associated with an end user to a deployed traffic detection function (TDF) node or bypassing of data flows from the TDF node depending on the end user's privacy policy.

BACKGROUND

The technical specification 3GPP TS 23.203 (version V11.0.1; January 2011) discloses a Policy and Charging Architecture (PCC) used in a telecommunications system, which allows among other things the application of charging and quality of service (QoS) policies to data flows of the data sessions of their users. FIG. 1 (PRIOR ART) illustrates one of the PCC architectures 100 disclosed in 3GPP TS 23.203 (V11.0.1). The PCC architecture 100 comprises these main functional entities: a Home Policy and Charging Rules Function 102 (H-PCRF 102), a Policy and Charging Enforcement Function 104 (PCEF 104), a Gateway 105, and a Traffic Detection Function 106 (TDF 106). Briefly, the PCRF 102 behaves as a Policy Decision Point (PDP), or policy server, which stores user policies and determines which user polices are to be applied in each case. While, the network nodes implementing the PCEF 104 and/or the TDF 106 functionalities actually route data traffic flows to and from end users and behave as Policy Enforcing Points (PEPs) of the user policies. In addition, the PCC architecture 100 comprises an Online Charging System 108 (OCS 108), an Offline Charging System 110 (OFCS 110), a Subscription Profile Repository 112 (SPR 112), an Application Function 114 (AF 114), a V-PCRF 116, and a Bearer Binding and Event Reporting Function 118 (BBERF 118). The contents of the 3GPP TS 23.203 (version V11.0.1; January 2011) are hereby incorporated by reference herein.

In short, when a user terminal (usually referred as User Equipment, UE) initiates a data session through the mobile telecommunication system the PCEF communicates with the PCRF to download the PCEF policy rules (PCC rules) which are to be applied to the data session. The TDF performs Deep Packet Inspection (DPI) for the data flows belonging to the data session. The deep packet inspection includes inspecting the contents of the Internet Protocol (IP) packets of the data flows beyond the so called IP-5 tuples (i.e. beyond, IP origination/destination addresses and ports, and used transport protocol). The TDF based on this inspection then reports the application usage information for the data traffic flows to the PCRF. The PCRF then downloads policy rules to the TDF (as well as to the PCEF) which are to be enforced therein for these data traffic flows. The 3GPP TS 23.203 (version V11.0.1—FIG. 7.2-1) describes the so called "IP-CAN" session establishment, and the signalling interactions among the nodes implementing the aforementioned functions, which allows an end user to establish one or more data traffic flows through the telecommunication system via one or more data bearers.

Whilst the PCRF functionality is usually implemented within a standalone node, the PCEF functionality is usually co-located within an access gateway, such as a Gateway GPRS Support Node (GGSN). In turn, and for performance and efficiency reasons, the TDF node is advantageously implemented as a stand-alone node although their functionalities can be also co-located with a gateway intervening in a communication, such as a GGSN which also implements the PCEF functionalities. For example, the Ericsson product called "SASN" implements among other functions the DPI functionalities and thus it is a candidate to implement the TDF functionality disclosed by the 3GPP TS 23.203 (version V11.0.1).

The basic functionality for the Traffic Detection Function (TDF) is described in the aforementioned 3GPP TS 23.203 (V11.0.1). Aspects related to the TDF functionality, as well as the need for such functionality, are further discussed in the 3GPP TR 23.813 (V0.5.0) (the contents of which are incorporated herein by reference). In short, the need for a TDF stems from the hindsight that the operator of a telecommunication system might be interested in having traffic related policies with regard to certain specific services and that it may not always become aware of the usage of these services by its end users. The TDF and its standardized interworking with a policy server implementing the PCRF functionality addresses this issue and provides service awareness so the operator can enforce e.g. the corresponding charging and/or QoS policies.

In accordance with 3GPP TS 23.203 (V11.0.1), the routing of data packets of an end user's data session through the "Gi" or "SGi" interfaces (e.g. from a gateway, such as a GGSN or a Packet Data Network Gateway (PDN-GW), towards a certain data network) are currently dependent on the Access Point Name (APN) and IP address which are determined when the IP-CAN session of the user is initiated and established (e.g., see FIG. 7.2-1 of 3GPP TS 23.203 referred above, and related flow descriptions). And, during the IP CAN session establishment for a user the APN is selected and an IP address is assigned to the user. So, even prior to any opportunity for a policy decision to be made by the PCRF, the path which the end user packets will follow when establishing data communications with other parties within the data session (e.g. with other user terminals, application servers, etc) has already been predetermined. As a result of this static path determination, the end user's packets may always undergo deep packet inspection performed by a standalone TDF node configured in the data path. This deep packet inspection may be in conflict with the privacy preferences of the end user. Furthermore, using a predetermined way for routing user data packets does not fit well, and does not offer a feasible solution, for network operators willing to deploy and enforce policies based on awareness about access to certain services by their end users which can have an effect, for example, on the charging of the corresponding data flows, and/or on the application of QoS policies for the corresponding data flows.

In short, the main problem is that end users are assigned an APN (e.g. predefined within a Home Subscriber Server (HSS) which stores the profile data of the end user, or requested by an UE) and an IP address (e.g. assigned by a gateway implementing the PCEF functionality) before any dynamic policy decision is made e.g., by the PCRF. Thus, the routing of end user packets is influenced by the APN which may or may not have a TDF deployed. In addition, the assigned IP address within the APN may influence the IP routing when for instance the network design has segmented the IP address space into various IP address pools with different routing/forwarding properties. This IP assignment may result in end user packets being routed towards a TDF in conflict with the User Privacy Policy within the PCRF which may indicate that the consent of the end user has not been given for DPI of their data packets. Accordingly, there has been and is a need to address these problems and other problems associated with the traditional IP CAN session establishment. This need and other needs are satisfied by the present invention.

SUMMARY

A network node and a method which address the aforementioned problem with the IP-CAN session establishment are described in the independent claims of the present application. Advantageous embodiments of the network node and the method have been described in the dependent claims of the present application.

In one aspect, the present invention provides a network node (e.g., GW-PCEF) that participates in an IP-CAN session establishment within a telecommunications network. The network node is configured to: (a) receive a user privacy policy of an end user, wherein the user privacy policy indicates whether or not data flows to and from a user equipment used by the end user are to be routed through a TDF node; and (b) utilize the user privacy policy during the IP-CAN session establishment to assign an IP address to the end user, wherein the assigned IP address ensures that the data flows to and from the user equipment are routed or not through the TDF node depending on the user privacy policy. An advantage is that the network node ensures that deep packet inspection is performed or not performed on data flows to and from an end user in accordance with the user privacy policy of the end user.

In yet another aspect, the present invention provides a method implemented by a network node (e.g., GW-PCEF) for participating in an IP-CAN session establishment within a telecommunications network. The method comprising the steps of: (a) receiving a user privacy policy of an end user, wherein the user privacy policy indicates whether or not data flows to and from a user equipment used by the end user are to be routed through a TDF node; and (b) utilizing the user privacy policy during the IP-CAN session establishment to assign an IP address to the end user, wherein the assigned IP address ensures that the data flows to and from the user equipment are routed or not through the TDF node depending on the user privacy policy. An advantage is that the method ensures that deep packet inspection is performed or not performed on data flows to and from an end user in accordance with the user privacy policy of the end user.

In still yet another aspect, the present invention provides a network node (e.g., GW-PCEF) that participates in an IP-CAN session establishment within a to telecommunications network. The network node is configured to: (a) receive a request for IP-CAN bearer establishment of an user equipment; (b) send an indication of IP-CAN session establishment to a PCRF, wherein the PCRF interfaces with a SPR to obtain subscriber related information including a user privacy policy which indicates whether or not data flows to and from the user equipment are to be routed through a TDF node; and (3) receive an acknowledgment message from the PCRF, wherein the acknowledgment message includes a configuration option profile which is dependent upon the user privacy policy and defines and points to a set of local predefined PCEF configuration to be used for IP address allocation/IP configuration and subsequent routing of the data flows to and from the user equipment. An advantage is that the network node ensures that deep packet inspection is performed or not performed on data flows to and from an end user in accordance with the user privacy policy of the end user.

In still yet another aspect, the present invention provides a method implemented by a network node that participates in an IP-CAN session establishment within a telecommunications network. The method comprising the steps of: (a) receiving a request for IP-CAN bearer establishment of an user equipment; (b) sending an indication of IP-CAN session establishment to a Policy and Charging Rules Function (PCRF), wherein the PCRF interfaces with a Subscription Profile Repository (SPR) to obtain subscriber related information including a user privacy policy which indicates whether or not data flows to and from the user equipment are to be routed through a traffic detection function (TDF) node; and (c) receiving an acknowledgment message from the PCRF, wherein the acknowledgment message includes a configuration option profile which is dependent upon the user privacy policy and defines and points to a set of local predefined PCEF configuration to be used for IP address allocation/IP configuration and subsequent routing of the data flows to and from the user equipment. An advantage is that the method ensures that deep packet inspection is performed or not performed on data flows to and from an end user in accordance with the user privacy policy of the end user.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 3A-3C are a flow diagram illustrating the steps of an attach procedure which has been enhanced in accordance with embodiment nos. 1-2 of the present invention;

FIG. 10 is a flow diagram used to explain how GW (PCEF) can be enhanced to perform IP-CAN Establishment prior to IP assignment pursuant to embodiment no. 8 in accordance with the present invention.

DETAILED DESCRIPTION

Figure 1:
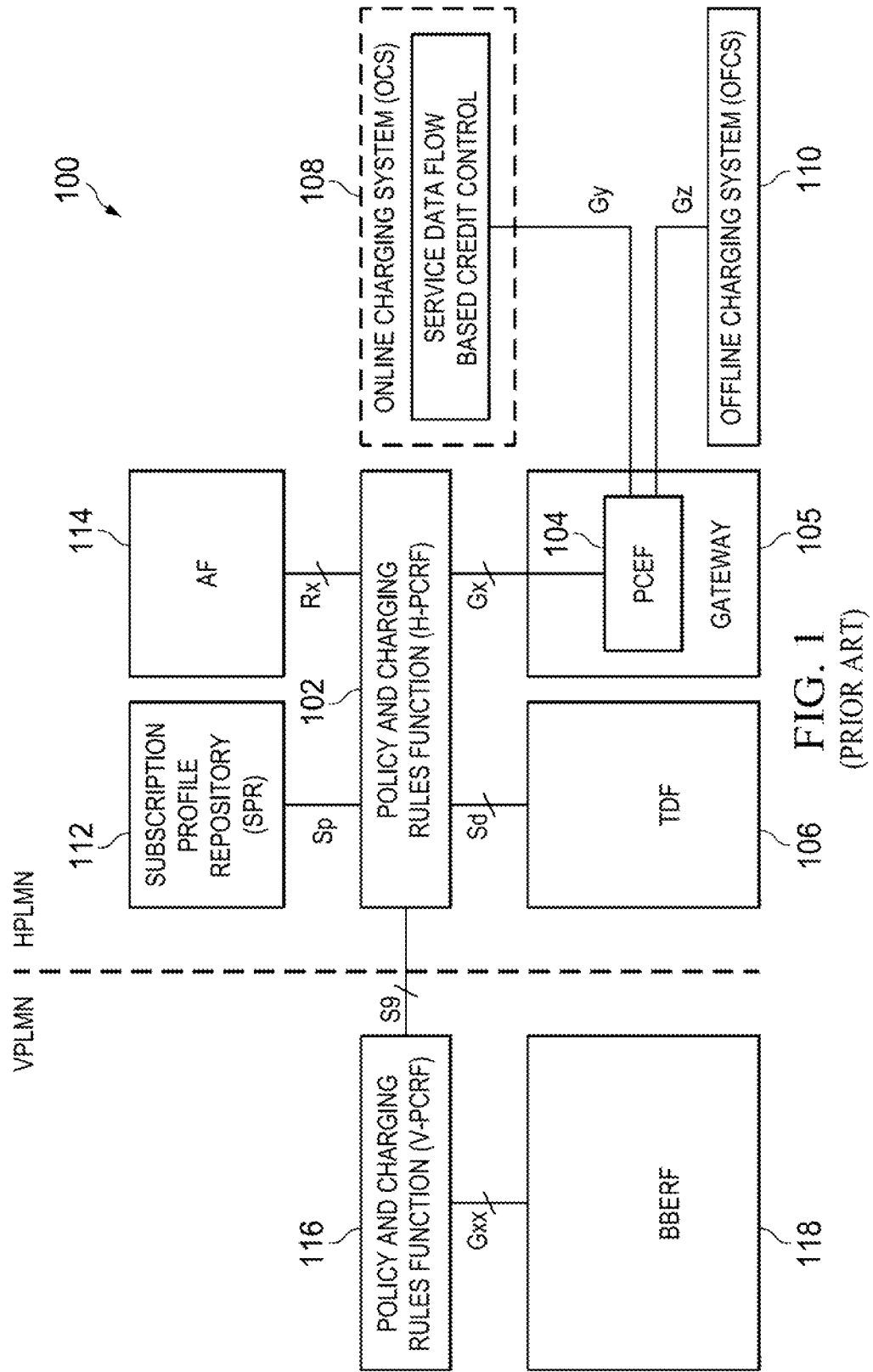
FIG. 1 (PRIOR ART) illustrates one of the PCC architectures disclosed in 3GPP TS 23.203 (V11.0.1).

Disclosed herein are various embodiments of a network node (e.g., GW-PCEF, PCRF) and methods in accordance with the present invention that solve or at least mitigate the aforementioned problems associated with the traditional IP-CAN session establishment, and which minimize the implementation impact in the PCC architecture disclosed in the current 3GPP specifications and in the current commercial products envisaged to accommodate the various functionalities implemented by the PCC architecture. In accordance with the present invention, the network basically controls, through subscriber profile data and/or policy pre-configured control data, whether deep packet inspection for data flow/s for an IP-CAN session established by an end user should take place, or not, according to a defined "User Privacy Policy", and, in the former case, to which TDF node the data flow(s) should be directed. For example, one of the embodiments (solutions) comprise letting the PCRF know the corresponding applicable "User Privacy Policy", so as to impact the IP-address allocation/IP-configuration performed at IP-CAN session establishment of an end user and determine whether data flows to/from the end user shall or not be routed through a TDF for being "deeply" inspected therein. Thereby, a routing-wise solution is described that allow packets belonging to data flows of the end user in the data session, both in the uplink and the downlink direction, to depending on the user privacy policy be accordingly routed or not through a TDF and, in the former case, also allowing that the packets in the uplink and downlink direction to advantageously be "steered" to the same TDF node. Eight exemplary embodiments (exemplary solutions 1-8) of the present invention which address or at least mitigate the aforementioned problems associated with the traditional IP-CAN session establishment are disclosed in detail herein below.

Embodiment Nos. 1-2

In embodiment nos. 1-2, two relatively static methods of providing control via control in a Home Subscriber Server (HSS) or an Authentication Authorization Accounting (AAA) server through separate APN definitions, or separate IP address space within a given APN, are detailed. These two methods are relatively static in nature and do not give full dynamic control to PCRF but nevertheless address or at least mitigate the aforementioned problems associated with the traditional IP-CAN session establishment process.

I. Separate APNs are Deployed in Network (Embodiment No. 1)

A partial solution to the above problem can be solved through network design and provisioning of the appropriate APN to the end user. For example two APNs can be defined one defining internet access with TDF inspection and one without as follows:

INTERNET_with_TDF
INTERNET_without_TDF

The HSS, as an entity providing in this case the equivalent of the user privacy policy, which in the other embodiments 3-8 are normally provided by the so-called SPR functionality, would be provisioned with a default APN that should be assigned to the end-user in accordance with desired privacy policy. This requires that the HSS provision a "User Privacy Policy" for the corresponding end user to be consistent with privacy policies in the PCRF/SPR.

At network attach the APN is retrieved by the mobility management entity/Serving GPRS Support Node (e.g. MME/SGSN) and during the PDP context activation leads to the selection of the appropriate P-GW/GGSN which has implemented connectivity to the appropriate packet data network (i.e. Internet access with TDF or internet access without TDF) as selected by the APN.

The following are some features, and advantages associated with embodiment no. 1:

The default APN is configured accordingly in end-user subscription:
  The end user can be assigned a default APN in which no TDF is deployed (e.g. via 3GPP TS 29.272 V9.5.0 "Update Location Answer" message)
Alternately can use the "Radius Assisted APN selection" to assign appropriate APN (see embodiment no. 7).
Positive: no standards impacts.

II. Separate IP Address Pools within the Same APN (Embodiment No. 2)

The network design here ensures that a P-GW or GGSN partitions a given APN into separate IP Pools.

Typically, the available IP address space associated with an APN may be partitioned into different IP address ranges. Each IP address range would be defined within a Local IP address pool associated with the APN. End user terminals (UEs) are assigned an IP address from one of these local IP address pools, so as to enforce the corresponding User Privacy Policy.

For example, a first IP address Pool is reserved for TDF bypass. In addition a second IP address Pool is reserved for TDF IP-CAN session that should undergo deep packet inspection and, thus, which IP flows shall be routed through a TDF node.

The IP address assigned to the user terminal equipment (UE)—namely the IP address that this UE will use as "source IP address" on its subsequent uplink data flows—can then be used to ensure that the end-user data flows are routed towards a path that bypasses, or not, a TDF depending on the corresponding User Privacy Policy.

Network deployment/design to accomplish this could use filter based forwarding or policy based routing techniques in the deployed equipment (e.g., site routers, switches, etc).

This technique allows control of the next hop selection (i.e. TDF) for user traffic by defining packet filters that examine the fields in the packet header. This technique allows through appropriate configuration of equipment that the packets can be routed to a given TDF based on the source IP address (i.e. user's IP) if permitted by the end user. For example, the configured policy can ensure that the forwarding to a specific TDF is achieved when an uplink user source IP address matches against a specific IP address pool range.

With the above network design in place, the following procedures could be followed to ensure that an end user is assigned an IP address from the appropriate IP address pool to control whether the end user data packets will eventually be routed to the TDF or bypass the TDF.

As part the UE initial attach (i.e. TS 23.060 v10.2.0 ch 6.5.3 figure step 7h and TS 23.401 V10.2.1 FIG. 5.3.2.1-1 Attach procedure step 11):

HSS (or HLR) is enhanced to return a "TDF bypass flag" as part of "subscription data" (e.g. via TS 29.272 V9.5.0 "Update Location Answer" message), which relates to the corresponding User Privacy Policy.

Figure 2A:
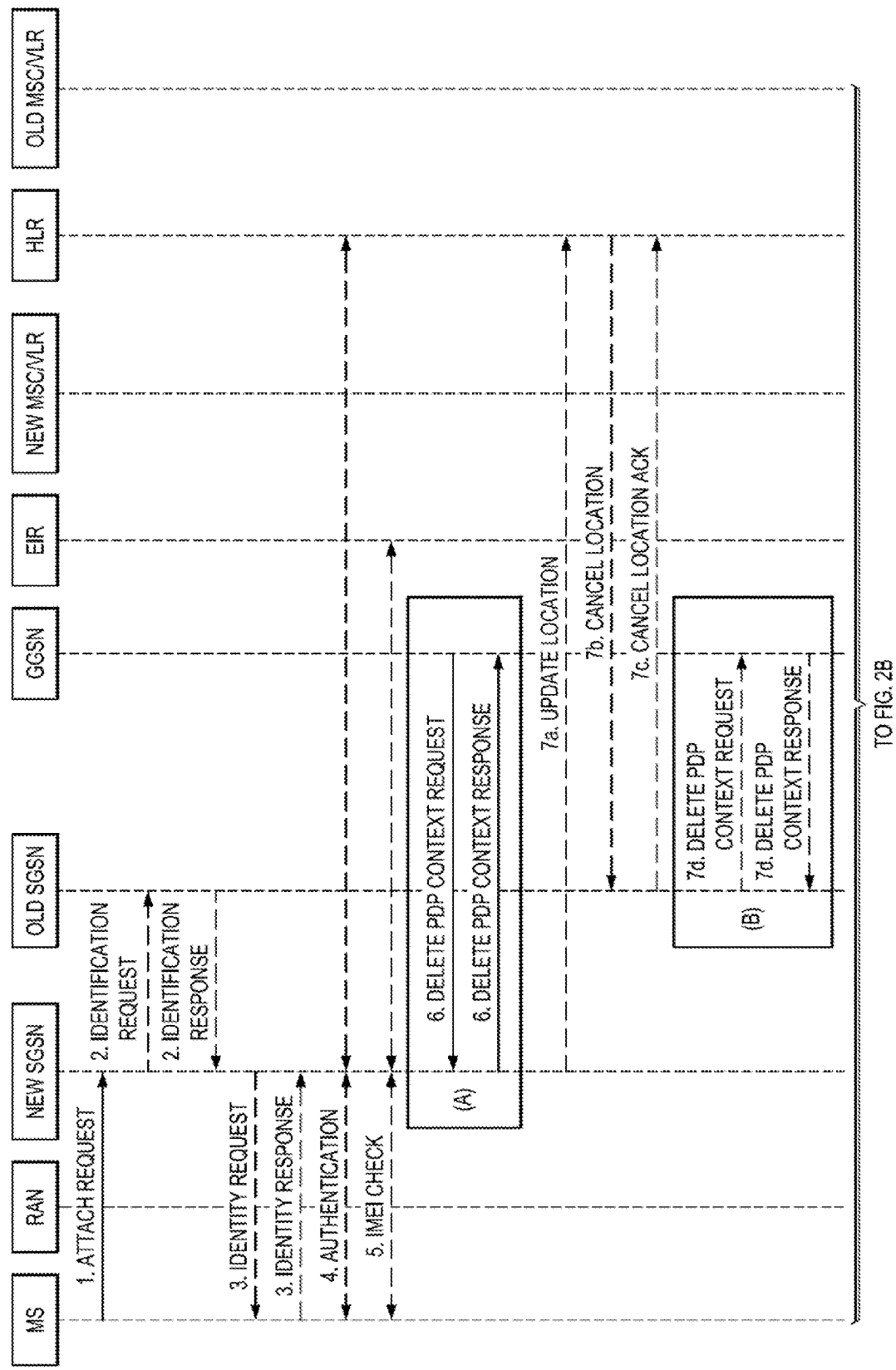
FIGS. 2A-2B are a flow diagram illustrating the steps of a combined GPRS/IMSI attach procedure which has been enhanced in accordance with embodiment nos. 1-2 of the present invention.
Figure 2B:
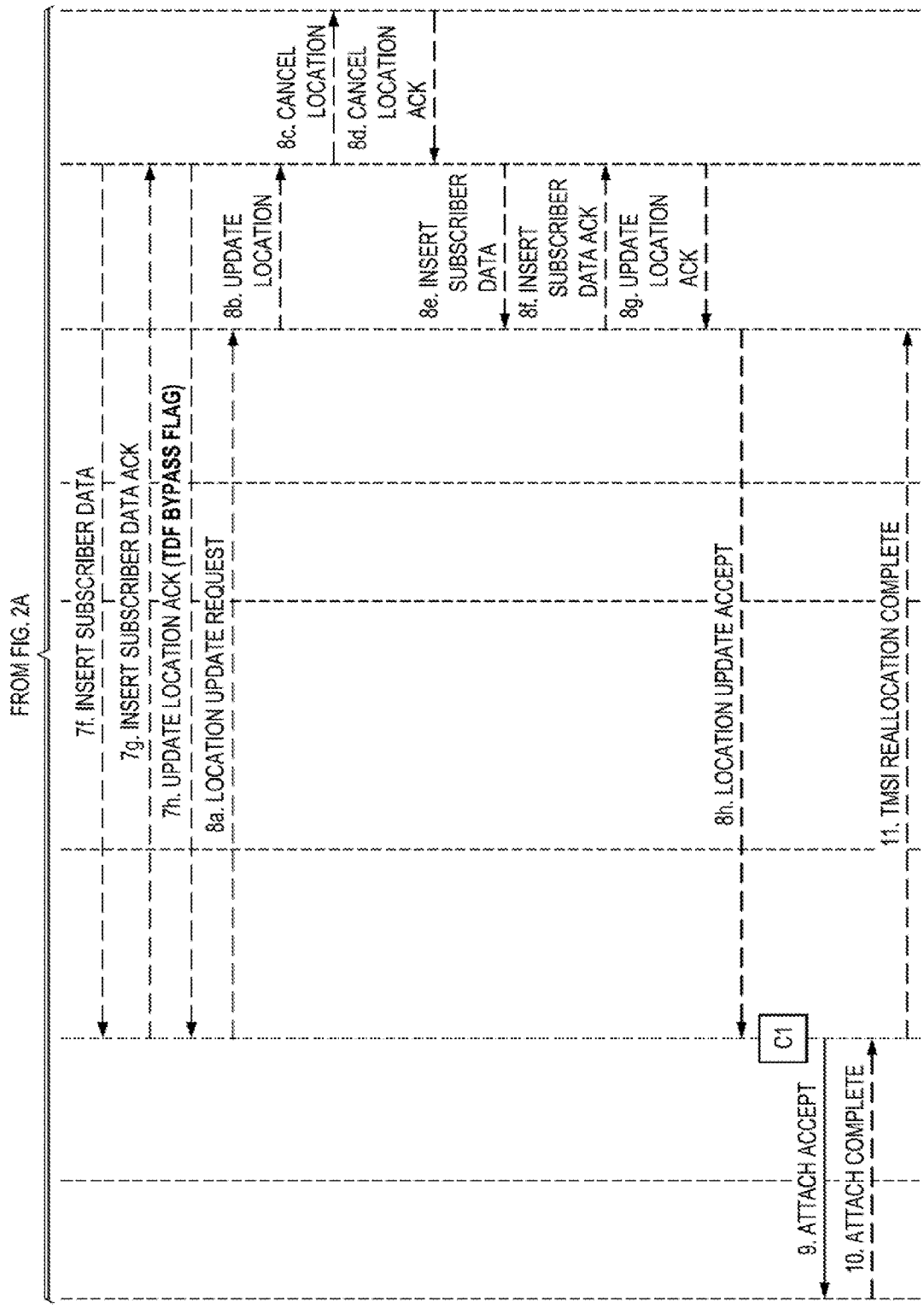

Note 1: FIGS. 2A-2B is a signal flow diagram illustrating the Combined GPRS/IMSI Attach Procedure of TS 23.060 v10.2.0 which has been enhanced with the "TDF bypass flag" added to step 7h (see appendix A for detailed discussion of steps 1-11).

Figure 3A:
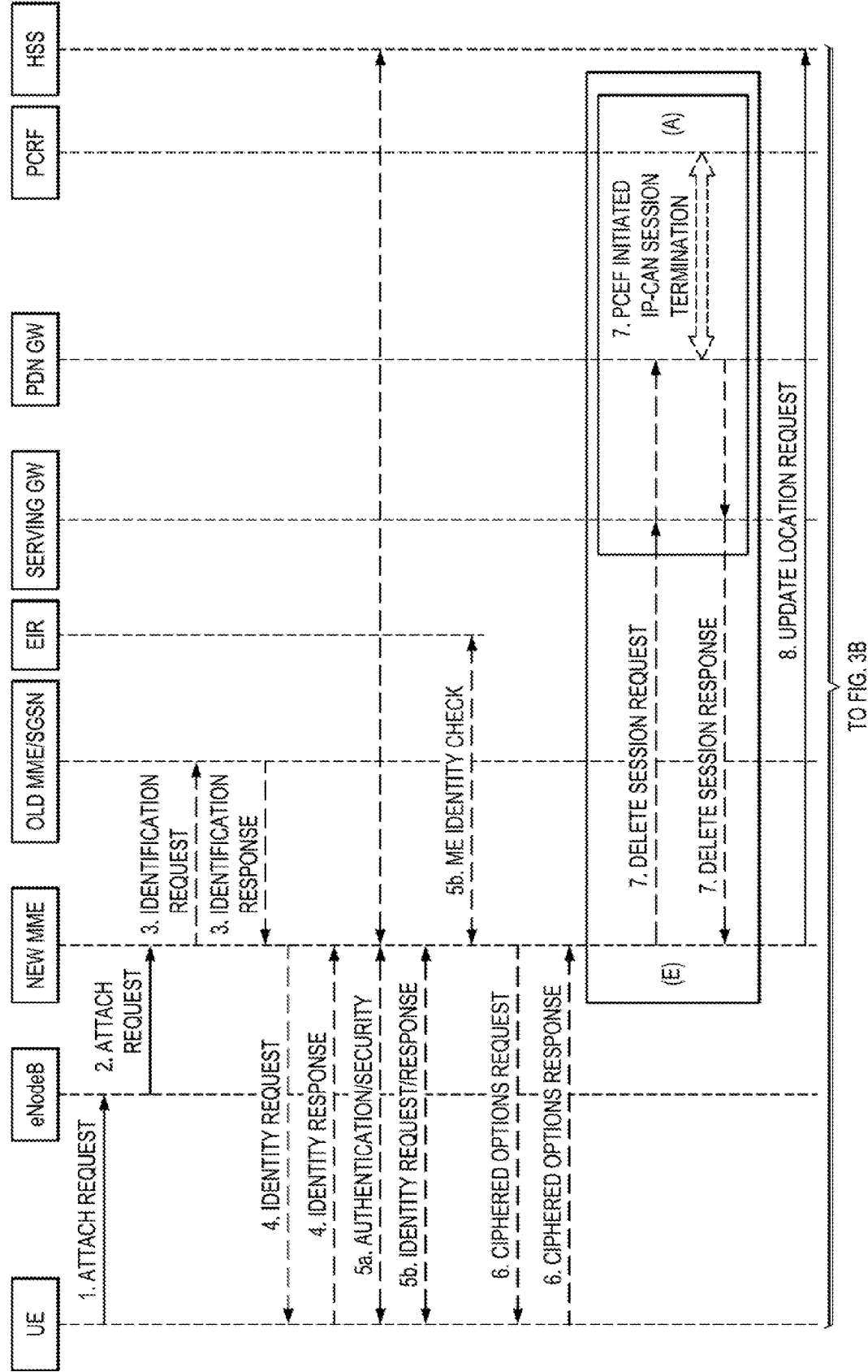
Figure 3B:
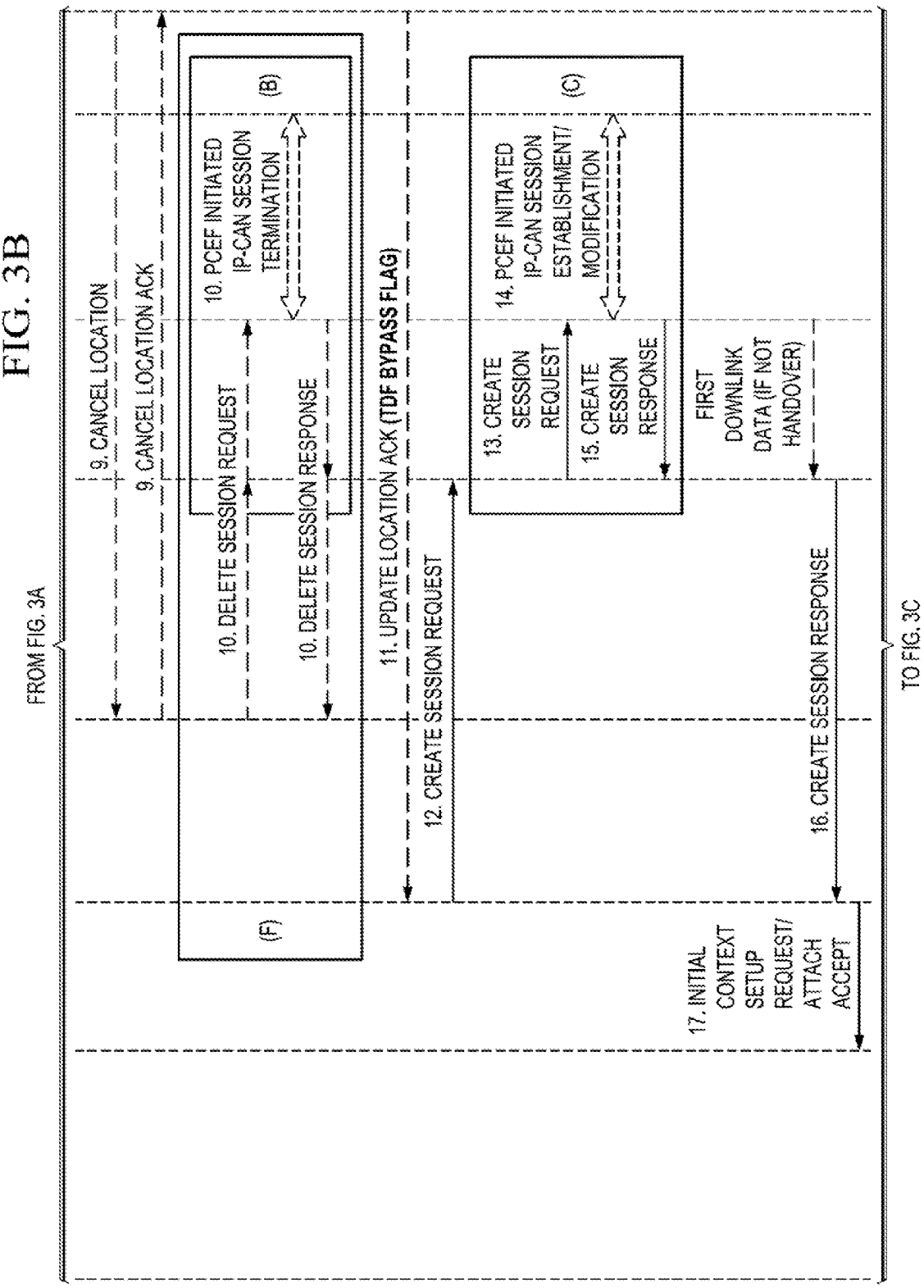

Note 2: FIGS. 3A-3C are a signal flow diagram illustrating the Attach Procedure of TS 23.401 V10.2.1 which has been enhanced with the "TDF bypass flag" added to step 7h (see appendix B for detailed discussion of steps 1-26).

Figure 4:
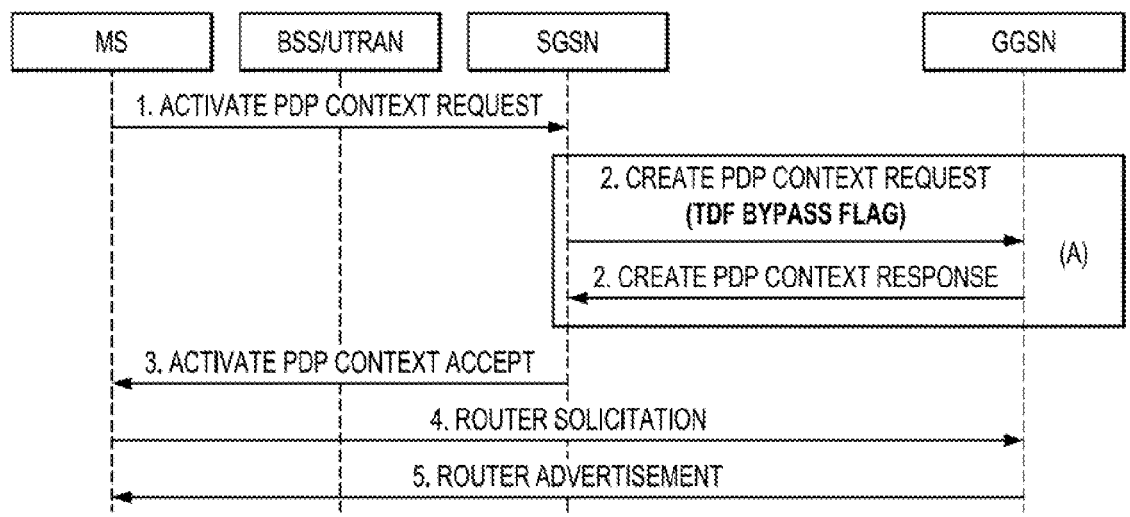
FIG. 4 is a flow diagram illustrating the steps of an IPv6 stateless address autoconfiguration procedure which has been enhanced in accordance with embodiment nos. 1-2 of the present invention.
Figure 5:
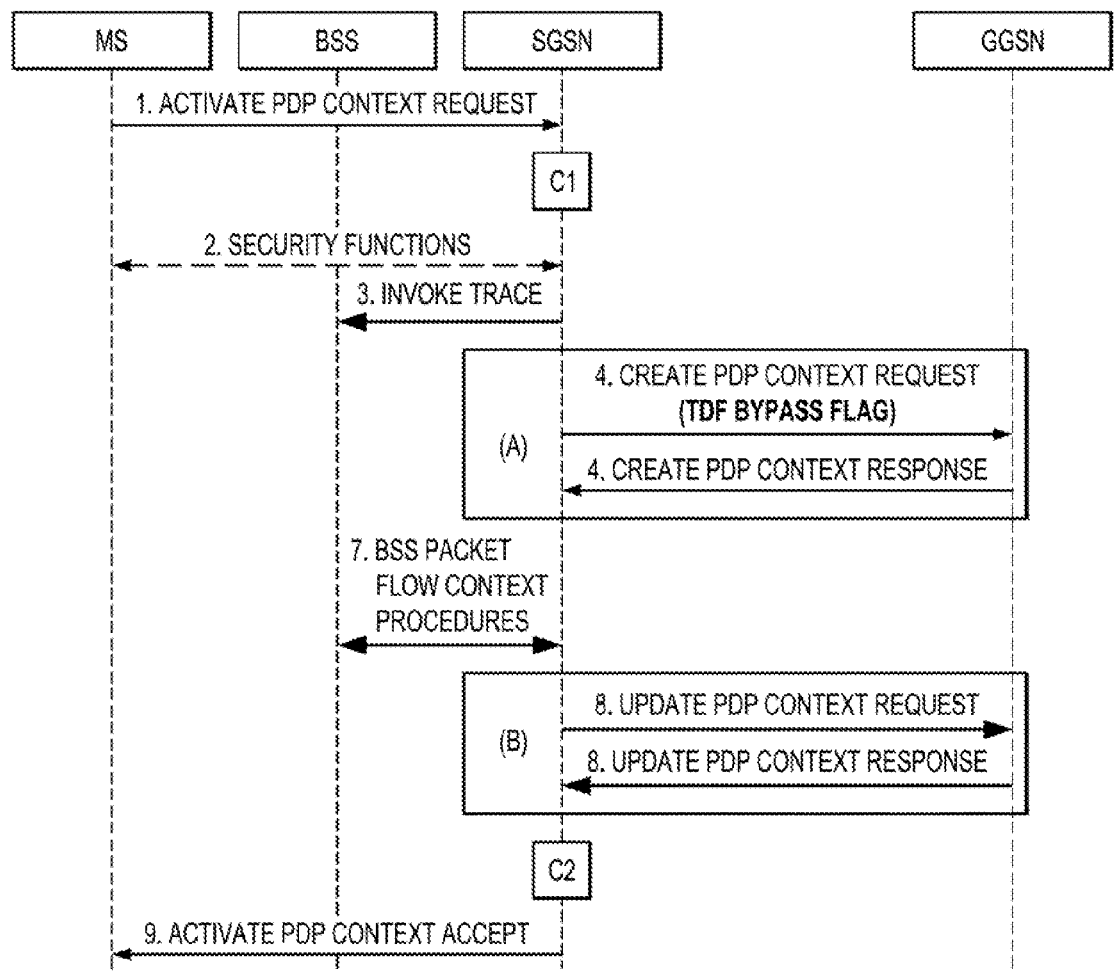
FIG. 5 is a flow diagram illustrating the steps of a PDP context activation procedure for A/Gb mode which has been enhanced in accordance with embodiment nos. 1-2 of the present invention.
Figure 6:
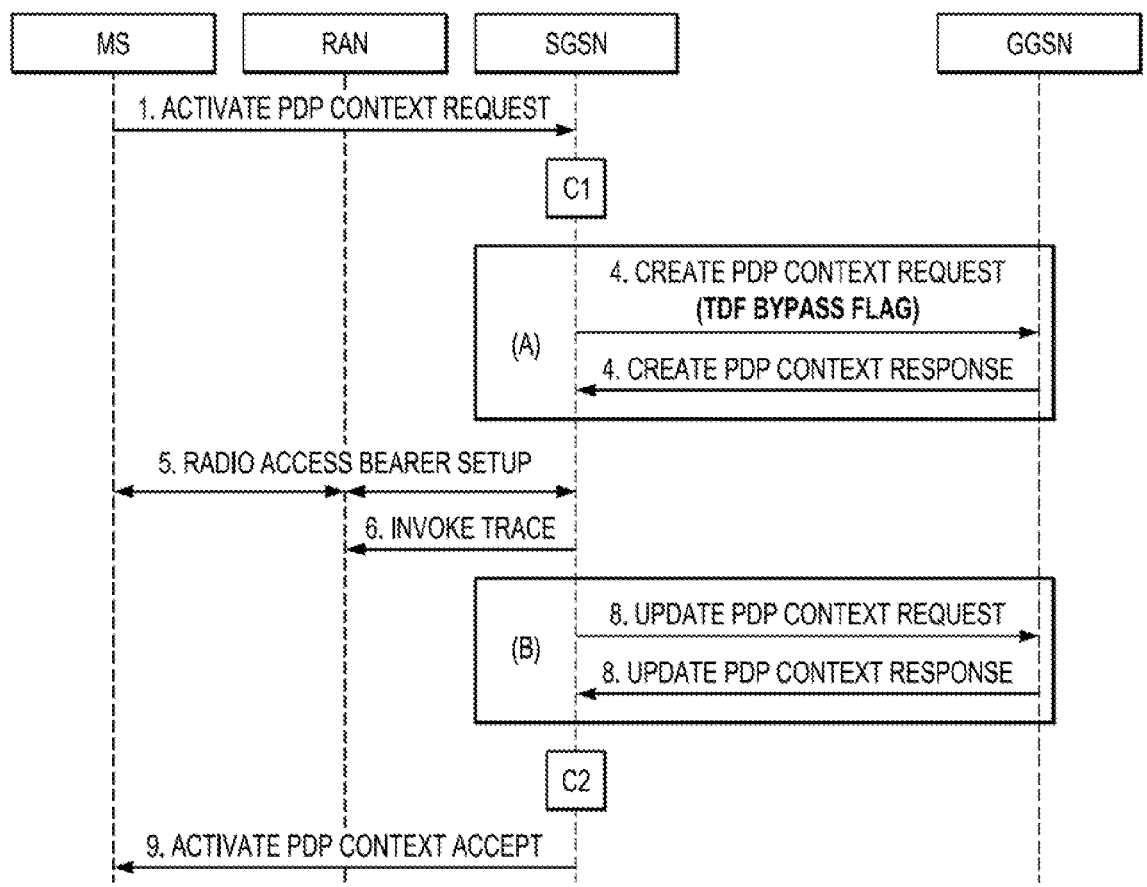
FIG. 6 is a flow diagram illustrating the steps of a PDP context activation procedure for Iu mode which has been enhanced in accordance with embodiment nos. 1-2 of the present invention.

As part of PDP activation procedures (e.g., TS 23.060 chapter 9.2.21, FIGS. 62, 63, and 64) a "Create PDP Context Request" with the new "TDF bypass flag" is sent to GGSN (see FIGS. 4-6). Similarly for E-UTRAN (TS 23.401 FIG. 5.3.2.1-1 Attach procedure) a "Create Session Request" with the new "TDF bypass flag" is sent to the P-GW (steps 12,13)(see FIG. 3).

The "TDF bypass flag" is forwarded in GPRS Tunnelling Protocol, (GTP) 3GPP TS 29.274 GTPv2 version V10.1.0, 3GPP TS 29.060 GTPv1 version V10.0.0) to P-GW/GGSN.

Note 1: FIG. 4 is a signal flow diagram illustrating the IPv6 Stateless Address Autoconfiguration Procedure shown in FIG. 62 of TS 23.060 v10.2.0 which has been enhanced with the new "TDF bypass flag" added to step 2 (see appendix C for detailed discussion of steps 1-5).

Note 2: FIGS. 5-6 are signal flow diagrams respectively illustrating the PDP Context Activation Procedure for A/Gb mode shown in FIG. 63 and the PDP Context Activation Procedure for Iu mode shown in FIG. 64 of TS 23.401 V10.2.1 which have been enhanced with the new "TDF bypass flag" added to step 4 (see appendix D for detailed discussion of steps 1-9).

The P-GW/GGSN IP address allocation for the end user is enhanced such that at the reception of the "Create Session Request"/"Create Packet Data Protocol (PDP) Context Request" it can:

A. use the TDF bypass flag as a trigger to allocate an IP address from a local pool (P-GW) that will bypass the TDF if so indicated by the "TDF bypass flag" or allocate an IP address from Pool forcing TDF enforcement.

B. Or if using AAA for IP address allocation, the P-GW sends a flag to AAA such that it serves as a trigger for the AAA to allocate an IP address from pool that will bypass the TDF or force TDF enforcement The following are some features, and advantages associated with embodiment no. 2:

HSS returns a "TDF bypass flag" as part of "subscription data" (e.g. via 3GPP TS 29.272 V9.5.0 "Update Location Answer" message).

"TDF bypass flag" forwarded in GTP to P-GW/GGSN. P-GW/GGSN can:

A. use this flag as a trigger to allocate an IP address from a local pool (P-GW) that will bypass the TDF.

B. or if using AAA for IP address allocation, the P-GW sends flag to the AAA such that it serves as a trigger for the AAA to allocate an IP address from an IP pool that will bypass the TDF.

Assumption

P-GW partitions any given APN into separate IP Pools: Some IP address pool reserved for TDF bypass.

Network deployment/design would require equipment to use "Filter based forwarding" or "Policy based Routing" in deployed equipment (Site routers, switches).

The IP address assigned to the MS (i.e. source IP address) could be used to ensure to route the end-user towards a path that bypasses the TDF.

Embodiment No. 3: TDF Routing Controlled by a Policy Server, Such as a PCRF

TDF routing controlled by a policy server, such as a PCRF, enables the gateway (e.g., GGSN/P-GW) to divide traffic originally designated to one Access Point Name (APN) into several virtual networks or "Service APNs" based on a policy set locally in the gateway (e.g., GGSN, P-GW) or set on individual subscriber level by a policy server (e.g. PCRF) and downloaded to the gateway (e.g., GGSN, P-GW).

A given APN can be defined to have several Service APNs. Operator configuration on a per Service APN basis would allow for example one to define a Service APN that does not have any TDF deployed. As well allow one to define other service APNs that would have deployed TDFs. Thereby also allowing one to control to which specific TDF a given user traffic should be routed.

Within the gateway (e.g., GGSN/P-GW) various techniques can be used to create the Virtual Private Networks (VPNs) for traffic separation. This can include logical (e.g., Virtual Local Area Network (VLAN)) or physical (e.g., layer 2) VPN techniques.

The criteria to determine over which service APN the end user packets are routed can be based on TDF privacy maintained in the PCRF. The PCRF passed policy to the gateway would point to a service APN that is aligned with desired privacy policy. So for example, if the privacy policy indicates that DPI is not permitted the PCRF would pass policy to the gateway that would enable this control by referencing a service APN that has no deployed TDFs in the path.

One example method to achieve this technique would be to introduce over the Gx interface a new attribute pointing to a TDF Routing Profile (the Gx interface is located between PCRF and the gateway—e.g., see FIG. 1). This new attribute would lead the gateway to a configured policy and enable the routing of the end user data flows over the appropriate Service APN.

A second method would be for the Policy and Charging Rules Function (PCRF) to provide a "TDF bypass indication" over the Gx interface to the gateway (see also embodiment no. 5). Based on this indication from the PCRF the gateway would use this as a trigger to point to a default Service APN that bypasses all TDFs ensuring that DPI does not occur for this user.

If the "TDF bypass indication" is set marking that a TDF is permitted an optional routing rule reference could be provided over the Gx interface indicating which service APN and by extension the corresponding TDF that should perform the inspection for this user.

A further extension of the concept to control which user traffic is passed or not through the TDFs could be based on PDP Context Data. For example, if the user privacy policy indication allows for DPI (i.e. for routing data flows through TDFs), then a determination on whether DPI inspection is really required and which TDF should perform inspection could be based on further criteria such as for example the PDP Context Data available in the gateway:

Criteria for directing to specific TDFs could be based on any combination of:
- SGSN/MME IP Address
- Serving network Mobile Country Code (MCC)+Mobile Network Code (MNC)
- Radio Access Technology (RAT) Type
- Subscriber information (Mobile Subscriber ISDN Number MSISDN, International Mobile Subscriber Identity IMSI, International Mobile Equipment Identity IMEI, or IMEI including-Software Version, IMEI-SV)
- Traffic Class (Conversational, Streaming, Interactive or Background)
- QoS Maximum Bit Rate MBR, Traffic Handling Priority, etc)

For example, using the RAT Type this could allow enabling TDF inspection in the case user makes access over 3G versus 2G access. Or if IMEI indicates the device is from a specific manufacture (i.e. M2M Machine-to-Machine type device manufacturer) a decision to could be made to bypass DPI if so desired by the operator.

Or traffic for subscribers with a High QoS could trigger bypassing DPI to ensure that no further latency is introduced for the end-user.

A further elaboration of the rule could be to actually use some minimal packet inspection in the gateway such that service awareness could also be a factor in determining if routing to a specific service APN and thereby routing towards a dedicated or optimized TDF is necessary. Criteria could include:
- Transmission Control Protocol (TCP)/User Datagram Protocol (UDP) port number
- Source and Destination IP address
- Detected Protocol through layer 4-7 inspection For example, a first stage of minimal layer 3 IP inspection in the gateway may indicate that the destination address is towards a domain or service (i.e. Port number) that warrants further second stage DPI beyond just layer 3 in the dedicated TDF node. Based on this policy these user packets would be routed along a Service APN towards a dedicated TDF that is optimized for deeper packet inspection techniques (e.g., update Layer 7 or heuristic based inspection).

The solution can avoid routing ambiguity through the use of Network Address Translation (NAT) function. For example, if two or more Service APNs are routes to the same network and each has a TDF, and it must be ensured that the downlink traffic is routed back through the same path, the gateway can be configured to perform "NATing" of the UE's IP address towards the Service APNs. In this case Local Pool IP-Address allocation method is used on the Service APNs. This technique can be used to steer traffic and ensure that a subscriber's downlink traffic can be steered to the same TDF which is handling the uplink traffic.

The following are some features and advantages associated with embodiment no. 3 (aware policy based routing based solution):
- A given base APN (e.g. internet Access) is assigned to UE.
- "Service APNs" are defined in GGSNs that are upgraded to become a Mobile Packet Gateway—MPG—in an EPS/EPC architecture (referred herein as GGSN-MPG, and which is referred in 3GPP specifications as GGSN Packet Gateway, GGSN/P-GW).
  e.g. Service APN with TDF deployed
  Service APN without TDF deployed
- At IP-CAN Establishment the PCRF provides over Gx an "Aware-Policy-based-Routing-Profile" that points to rule configuration that defines matching conditions (i.e. Match all) leading to sending traffic towards appropriate Service APN.
- GGSN/P-GW can determine to which Service APN end user packets are routed over Gi such that end user packets are subjected (or not) to any deployed TDF based on "dynamic" information provided by messages received from a PCRF via Gx interface.
- GGSN/P-GW applies "NAT" to ensure that Service APNs have different address space allowing downlink packets to take same path as uplink packets Embodiment No. 4: Gx Assisted Configuration Option (e.g., APN, Local Pool) Selection This solution allows the PCRF/SPR infrastructure to impact the IP-address allocation/IP-configuration performed at IP-CAN session activation. This can be achieved in a generalized manner by the PCRF returning a "configuration option profile" parameter to the gateway (GW) prior to IP address assignment to the UE. This configuration option parameter would point to a set of configuration data in the GW that could be used to achieve different results as needed. For example, the returned configuration option profile parameter points to GW configuration data that results in:
- Use of a specific local IP pool within the interface's "Gn" provided APN
- Use of a specific APN and override the interface's "Gn" provided APN
- Use a specific APN and local pool and other configuration that would affect routing for that user as per PCRF Privacy Policies.
- Bypass all traffic due to user privacy policy
- Bypass TDF for all IMS traffic (e.g. for efficiency reasons), but allow other flows to undergo DPI by an external TDF node when applicable.

Two solutions are described below with regard to the details of embodiment no. 4. However, the basics of both solutions are summarized before a detailed discussion is provided about each solution. In both solutions, the PCRF has an influence in the IP-address allocation/IP-configuration process performed by a gateway GW (e.g. GGSN, P-GW, etc, implementing a PCEF functionality) at IP-CAN session activation for a user terminal UE. This approach provides a routing-wise solution, with low impact in the standardized PCC architecture, that would work both in the up-link and the down-link direction and also both for IPv4 and IPv6.

These solutions can be achieved by using signaling through the "Gx" interface to allow the PCRF to provide the GW implementing the PCEF functionality with the applicable User Privacy Policy information; thereby, assisting the PCEF, prior to the IP address assignment, to configure and adapt the IP address allocation process in respect to User Privacy Policy with respect to DPI/TDF and, thus to determine IP routing for packets concerning data flows for an UE of a user. The PCEF can achieve this in two steps as follows:

The first step is that, as part of the IP-CAN session establishment, but prior to IP ADDRESS assignment, the PCEF can request the PCRF for a "configuration option profile" with regard to User Privacy Policy. The configuration option profile parameter returned by the PCRF to the PCEF could point to a set of preconfigured data in the PCEF that could be used to achieve desired results as needed and consistent with PCRF/SPR/UDR User Privacy Policy e.g. such as to bypass or a not the TDF. For example the set of preconfigured data on the PCEF could include a local IP address pool (and or APN) from which IP address assignment should be performed.

The second step is for the PCEF to perform the IP address assignment/IP configuration according to the information received from the PCRF, and then proceed with an IP CAN session modification towards the PCRF (e.g. UE IP Address Allocate event trigger).

Whether a PCRF-interaction before IP-Address allocation should be done or not can be configured in the PCEF as an operational parameter, for example on per APN basis, in order to avoid requesting the configuration option profile when it is not absolutely necessary and, thus, diminish unnecessary signaling that will occur if the PCRF interaction is performed before IP address allocation in all cases.

Basically, this two step approach ensures that a PCRF/SPR/UDR based end User Policy is considered in the decision of whether a given end user's traffic will or will not bypass standalone TDFs deployed over the Gi/SGi interface. As well the two step approach could ensure that a subscriber's downlink traffic can be steered to the same TDF which is handling the uplink.

Figure 7:
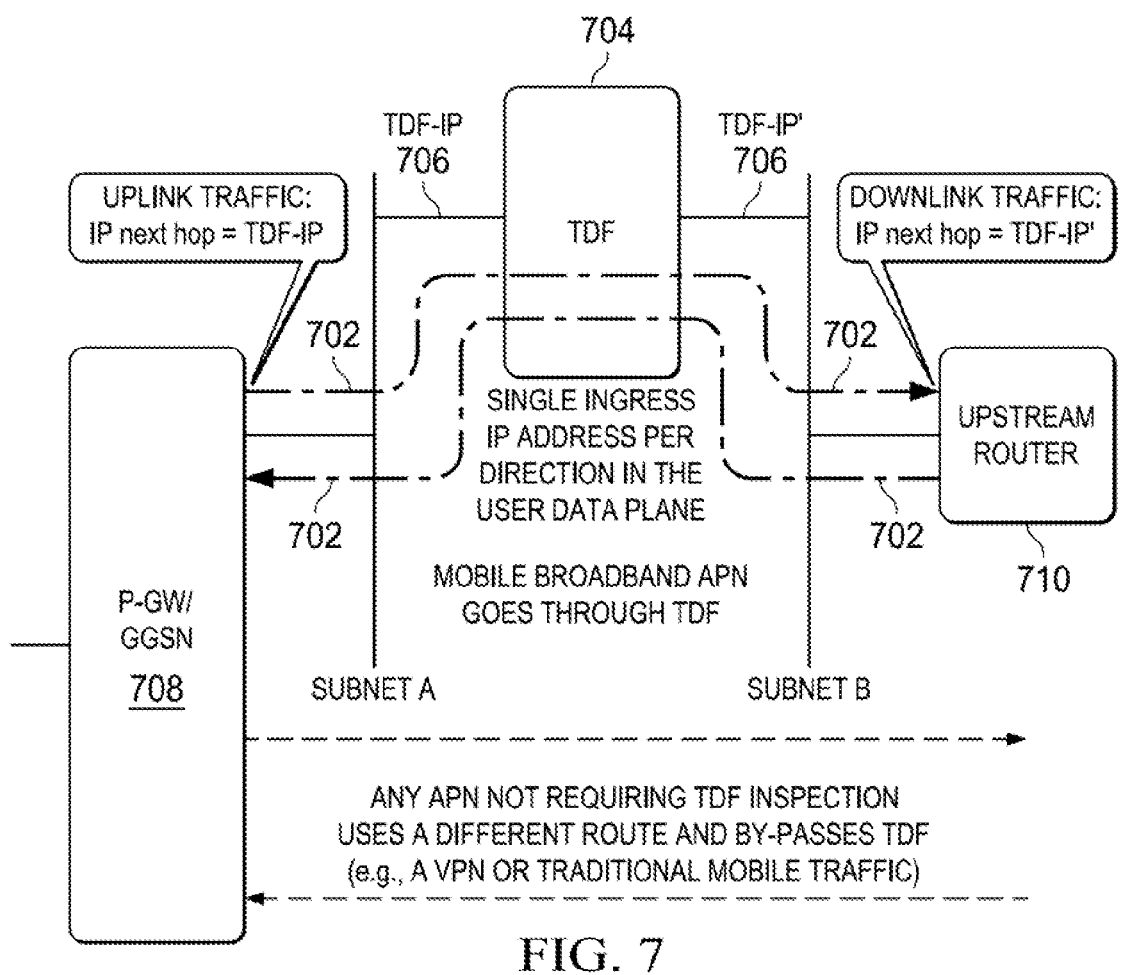
FIG. 7 is a diagram used to explain how user traffic can be captured in a standalone TDF over Gi/SGi in accordance with embodiment no. 4 of the present invention.

Referring to FIG. 7, there is a diagram illustrating how user traffic 702 can be capture in a standalone TDF 704 over Gi/SGi pursuant to embodiment no. 4 of the present invention. As shown, the TDF 704 is typically deployed in the data path 706 between the GGSN/P-GW 708 and the gateways (e.g., upstream router 710) to the service networks. For this purpose, the routing tables of adjacent IP network elements (e.g. GGSN/P-GW 708) are defined so that the TDF 704 is a next hop in the IP route of the user traffic 702. The TDF 704 would typically offer a unique next-hop IP address towards the user-side (e.g. GGSN/P-GW 708) and other unique next-hop IP address towards the internet-side (e.g. Internet Router 710 or firewall). The user traffic 702 is received by defining the TDF 704 as the next hop (or gateway) in the IP routing setup of two intermediate elements (in this example the GGSN/P-GW 708 and the upstream router 710) on the path of the target traffic. The IP routing through the TDF 704 could be defined both for the uplink and downlink traffic.

The following are some of the benefits associated with the aforementioned two step approach:

The operator PCRF/SPR server can utilize static subscription information, dynamic location information or any other relevant information (i.e. TDF Privacy policy) available to the PCRF infrastructure for choosing the "configuration option parameter" (e.g. points to set of configuration data on GW such as APN, local IP address pool) to use for a PDP context.

All handsets and data cards in the mobile fleet need only have only single APN configured, but certain end-uses traffic be distributed/routed such that DPI occurs over external TDF node whereas other end users bypass the TDF. For example this could be achieved by overriding Gn provided APN and/or using specific IP address pool.

TDF bypass that considers PCRF/SPR Privacy policy can be achieved by letting the PCRF impact the IP-address allocation/IP-configuration performed at IPCAN-session activation.

Provides a routing-wise solution, with low impact in the standardized PCC architecture, that would work both in the up-link and the down-link direction and also both for IPv4 and IPv6.

Embodiment No. 4 (First Solution)

Figure 8:
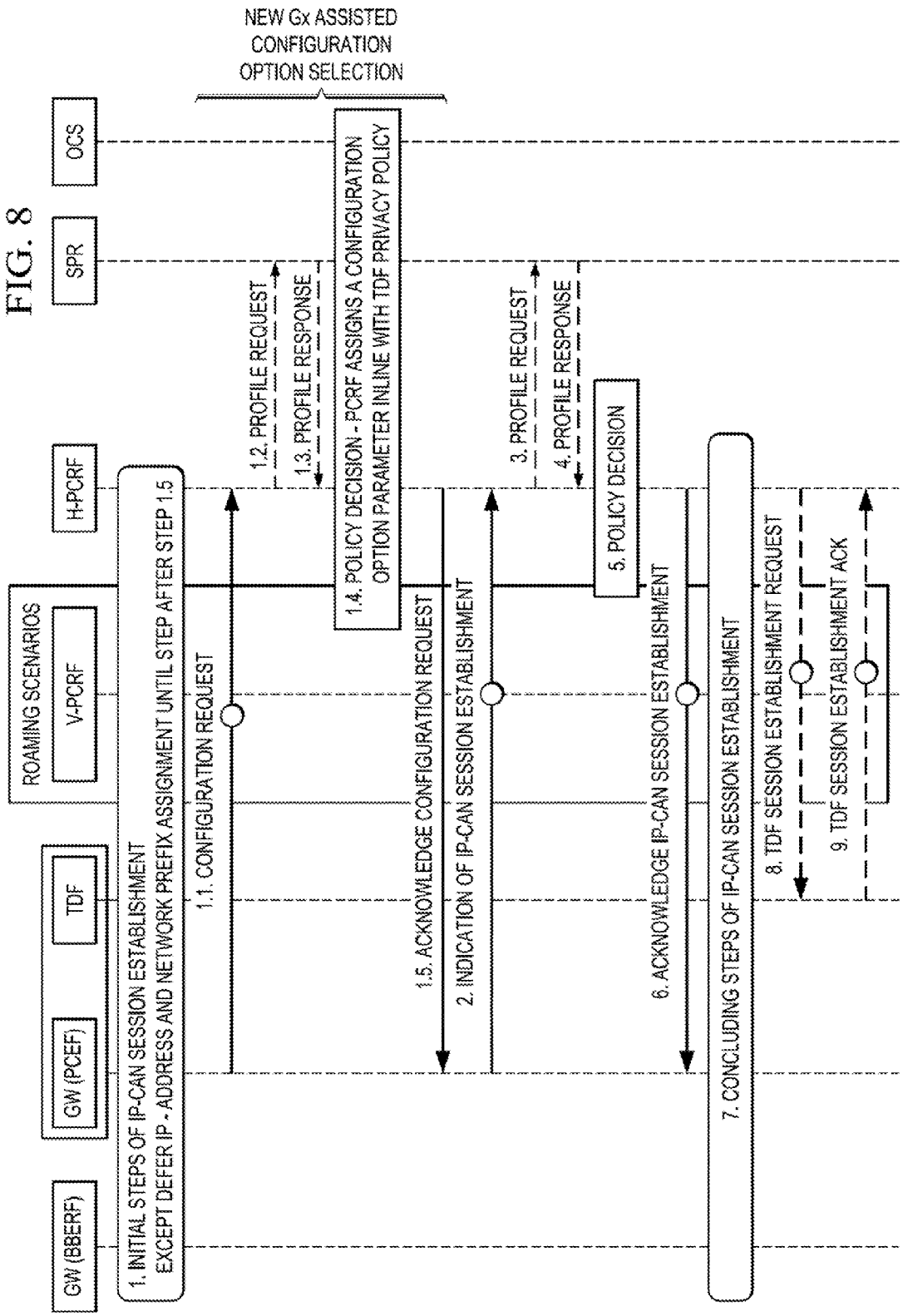
FIG. 8 is a flow diagram used to explain how a GGSN/P-GW can be enhanced to perform IP-CAN Establishment prior to IP assignment pursuant to a first solution of embodiment no. 4 in accordance with the present invention.

Details of an exemplary first solution for embodiment no. 4 are discussed below with reference to FIG. 8. The GGSN/P-GW is enhanced to perform IP-CAN Establishment prior to IP assignment per the following steps:

step 1.1: PCEF sends a Credit-Control-Request (CCR) to the PCRF (V-PCRF, H-PCRF). The CCR has a new Request-Type AVP set to "CONFIG REQUEST". The CCR could contain same AVPs though without the Frame-IP-Address AVPs.

steps 1.2-1.3: The PCRF retrieves the user profile from the SPR which is enhanced with "Privacy Policy".

step 1.4: The PCRF examines the Privacy Policy (e.g., DPI permitted or not for end-user) and assigns a configuration option profile parameter that is accordance with the privacy policy.

step 1.5: The PCRF returns a Credit-Control-Answer (CCA) to the PCEF. The CCA has a new proposed AVP "configuration option profile" inline with TDF privacy policies. The PCEF will use the returned "configuration option" parameter which points to a set of GW configuration parameters to be applied prior to proceeding with IP address assignment. For example, the GW configuration data could point to the use of a specific APN and/or local address pool, and specific routing configurations for the end user. The PCEF is enhanced to assign an IP address using the local configuration data associated with the configured option profile.

steps 2-7: Existing procedure IP CAN Session Establishment (Gx CCR "INITIAL_REQUEST"/CCA).

steps 8-9: TDF session establishment signalling.

The following are some features and advantages associated with embodiment no. 4's first solution:

This feature allows the PCRF/SPR infrastructure to select the APN to use for a PDP Context by replacing the APN received over Gn at PDP Context Create Request with an APN received in a new CCA message from the PCRF.

Benefits (same as for radius assisted APN selection+ exploit PCRF TDF privacy policy)

The operator PCRF/SPR server can utilize static subscription information, dynamic location information or any other relevant information (i.e. TDF Privacy policy) available to the PCRF infrastructure for choosing the APN to use for a Packet Data Protocol (PDP) context.

All handsets and data cards in the mobile fleet need only have only single APN configured, but traffic may transparently to the end-user be distributed over dedicated APNs.

Description

This feature replaces the APN received over Gn at PDP Context Create Request with an APN received in the CCA message from PCRF.

The GGSN/P-GW will during IP-CAN Establishment PRIOR TO IP ADDRESS assignment:

PCEF sends a Credit-Control-Request (CCR) with a Request-Type AVP set to "APN_REQUEST".

CCR could contain same AVPs though WITHOUT the Frame-IP-Address.

PCRF examines Privacy Policy (e.g. DPI permitted or not for end-user) possibly stored in SPR.

PCRF returns Credit-Control-Answer (CCA) with proposed APN inline with TDF privacy policies.

If received APN, on an APN that has been configured as a "Gx Assisted APN Selection APN" and the string is identical to a valid configured APN name on the PCEF (i.e. GGSN/P-GW), this APN will be selected for the PDP Context. If the string does not match a valid APN name the PDP Context Create Request will be rejected.

PCEF will use received APN and proceed with existing IP CAN Session Establishment.

Allocate IP address/network prefix.

Existing procedure IP CAN Session Establishment (Gx CCR "INITIAL_REQUEST"/CCA).

Embodiment No. 4 (Second Solution)

Figure 9:
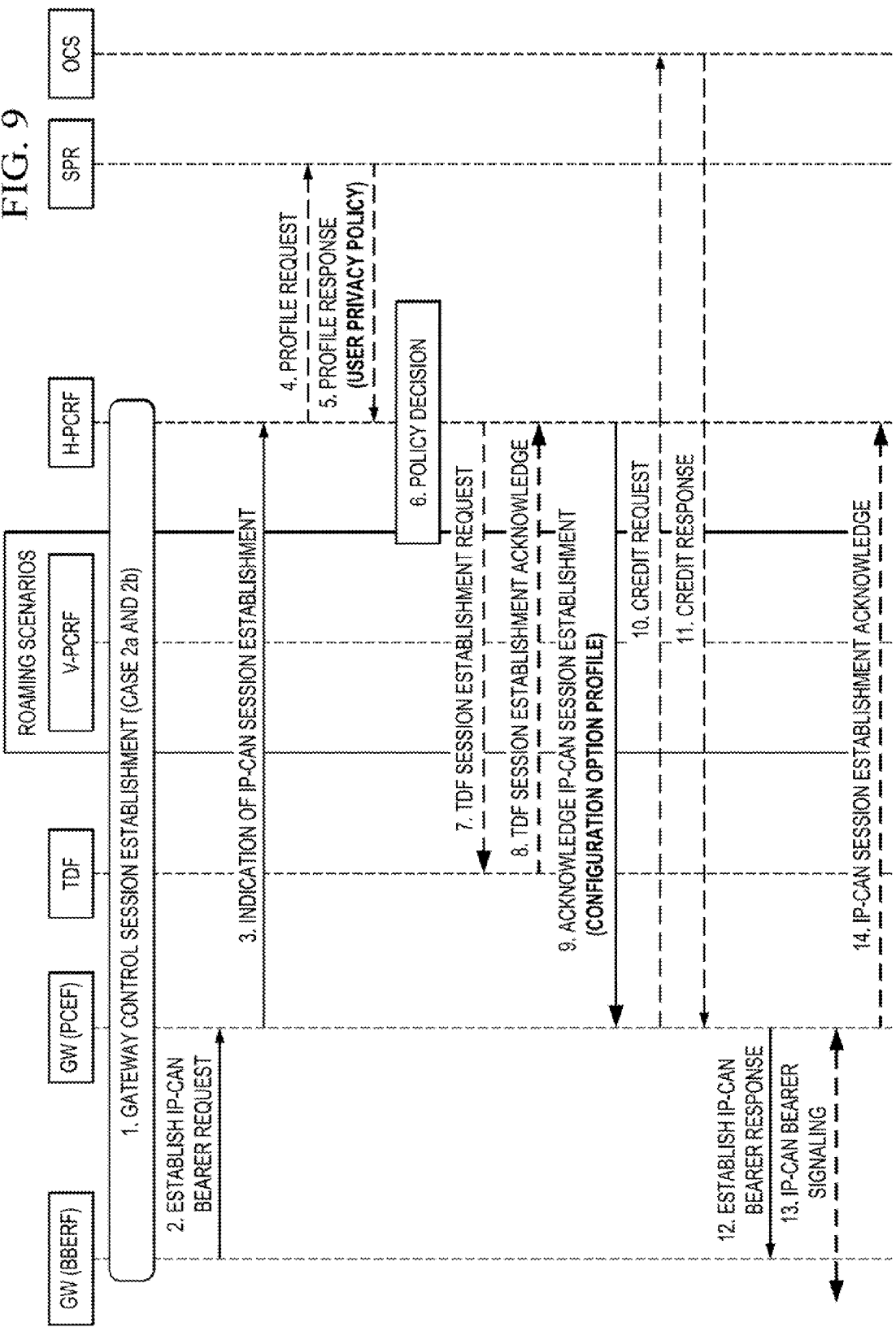
FIG. 9 is a flow diagram used to explain how a GGSN/P-GW can be enhanced to perform IP-CAN Establishment prior to IP assignment pursuant to a second solution of embodiment no. 4 in accordance with the present invention.

Details of an exemplary second solution for embodiment no. 4 is discussed below with respect to FIG. 9 which is taken from 3GPP 23.203 V 11.0.1, (chapter 7.2, "FIG. 7.2-1") and updated to show the "user privacy policy" and the "configuration option profile" associated with the second solution. The exemplary second solution is based on:

Use existing "IP-CAN Session Establishment" (but without sending a user IP address) and Acknowledge messages. Following IP address assignment the PCEF would use the IP CAN Session Modification signals and procedure.

The implementation of the exemplary second solution is discussed below by highlighting (via underline) how the existing procedure disclosed by 3GPP 23.203 (V 11.0.1) would be updated per the present invention. The original text of 3GPP 23.203 (V to 11.0.1) and the associated FIG. 7.2.1 IP-CAN Session Establishment are copied herein where the enhancements associated with the exemplary second solution of embodiment no. 4 are highlighted by underlines.

******* First Modified Section *****

6.2.2.1 General

The PCEF encompasses service data flow detection, policy enforcement and flow based charging functionalities.

This functional entity is located at the Gateway (e.g. GGSN in the GPRS case, and PDG in the WLAN case). It provides service data flow detection, user plane traffic handling, triggering control plane session management (where the IP-CAN permits), QoS handling, and service data flow measurement as well as online and offline charging interactions.

A PCEF shall ensure that an IP packet, which is discarded at the PCEF as a result from policy enforcement or flow based charging, is neither reported for offline charging nor cause credit consumption for online charging.

NOTE 1: For certain cases e.g. suspected fraud an operator shall be able to block the service data flow but still be able to account for any packets associated with any blocked service data flow.

The PCEF is enforcing the Policy Control as indicated by the PCRF in two different ways:

Gate enforcement. The PCEF shall allow a service data flow, which is subject to policy control, to pass through the PCEF if and only if the corresponding gate is open;

QoS enforcement:

QoS class identifier correspondence with IP-CAN specific QoS attributes. The PCEF shall be able to convert a QoS class identifier value to IP-CAN specific QoS attribute values and determine the QoS class identifier value from a set of IP-CAN specific QoS attribute values.

PCC rule QoS enforcement. The PCEF shall enforce the authorized QoS of a service data flow according to the active PCC rule (e.g. to enforce uplink DSCP marking).

IP-CAN bearer QoS enforcement. The PCEF controls the QoS that is provided to a combined set of service data flows. The policy enforcement function ensures that the resources which can be used by an authorized set of service data flows are within the "authorized resources" specified via the Gx interface by "authorized QoS". The authorized QoS provides an upper bound on the resources that can be reserved (GBR) or allocated (MBR) for the IP-CAN bearer. The authorized QoS information is mapped by the PCEF to IP-CAN specific QoS attributes. During IP-CAN bearer QoS enforcement, if packet filters are provided to the UE, the PCEF shall provide packet filters with the same content as that in the SDF template filters received over the Gx interface.

The PCEF is enforcing the charging control in the following way:

For a service data flow (defined by an active PCC rule) that is subject to charging control, the PCEF shall allow the service data flow to pass through the PCEF if and only if there is a corresponding active PCC rule with and, for online charging, the OCS has authorized credit for the charging key. The PCEF may let a service data flow pass through the PCEF during the course of the credit re-authorization procedure.

For a service data flow (defined by an active PCC rule) that is subject to both Policy Control and Charging Control, the PCEF shall allow the service data flow to pass through the PCEF if and only if the right conditions from both policy control and charging control happen. I.e. the corresponding gate is open and in case of online charging the OCS has authorized credit for its charging key.

For a service data flow (defined by an active PCC rule) that is subject to policy control only and not charging control, the PCEF shall allow the service data flow to pass through the PCEF if and only if the conditions for policy control are met.

A PCEF may be served by one or more PCRF nodes. The PCEF shall contact the appropriate PCRF based on the packet data network (PDN) connected to, together with, a UE identity information (if available, and which may be IP-CAN specific). It shall be possible to ensure that the same PCRF is contacted for a specific UE irrespective of the IP-CAN used.

The PCEF shall, on request from the PCRF, modify a PCC rule, using the equivalent PCEF behaviour as the removal of the old and the activation of the new (modified) PCC rule. The PCEF shall modify a PCC rule as an atomic operation. The PCEF shall not modify a predefined PCC rule on request from the PCRF.

The PCEF should support predefined PCC rules.

For online charging, the PCEF shall manage credit as defined in clause 6.1.3.

The operator may apply different PCC rules depending on different PLMN. The PCEF shall be able to provide identifier of serving network to the PCRF, which may be used by the PCRF in order to select the PCC rule to be applied.

The operator may configure whether Policy and Charging Control is to be applied based on different access point.

The PCEF shall gather and report IP-CAN bearer usage information according to clause 6.1.2. The PCEF may have a pre-configured Default charging method. Upon the initial interaction with the PCRF, the PCEF shall provide pre-configured Default charging method if available.

At IP-CAN session establishment the PCEF shall initiate the IP-CAN Session Establishment procedure, as defined in clause 7.2. In case the SDF is tunnelled at the BBERF, the PCEF shall inform the PCRF about the mobility protocol tunnelling header of the service data flows. In case 2a, defined in clause 7.1, the PCEF may provide charging ID information to the PCRF. The PCEF shall inform the PCRF on whether it is enhanced with TDF capabilities, and may include the address of a standalone TDF to be used for application detection and control. If no PCC rule was activated for the IP-CAN session the PCEF shall reject the IP-CAN session establishment.

In the case of standalone TDF deployments the PCEF may request a configuration option profile when initiating a IP-CAN session establishment prior to IP address allocation. This allows the PCRF to influence IP address allocation/IP configuration in accordance with end user consent stored in the User Privacy Policy. Subsequent IP address allocation the PCEF shall initiate the IP-CAN session modification procedure reporting the UE IPv4 address and/or IPv6 prefix (e.g. UE IP Address Allocate event trigger).

If there is no PCC rule active for a successfully established IP-CAN session at any later point in time, e.g., through a PCRF initiated IP-CAN session modification, the PCEF shall initiate an IP-CAN session termination procedure, as defined in clause 7.3.2. If the PCRF terminates the Gx session, the PCEF shall initiate an IP-CAN session termination procedure, as defined in clause 7.3.2.

If there is no PCC rule active for a successfully established IP-CAN bearer at any later point in time, e.g., through a PCRF initiated IP-CAN session modification, the PCEF shall initiate an IP-CAN bearer termination procedure, as defined in clause 7.4.1.

If the IP-CAN session is modified, e.g. by changing the characteristics for an IP-CAN bearer, the PCEF shall first use the event trigger to determine whether to request the PCC rules for the modified IP-CAN session from the PCRF; afterwards, the PCEF shall use the re-authorisation triggers, if available, in order to determine whether to require re-authorisation for the PCC rules that were either unaffected or modified. If the PCEF receives an unsolicited update of the PCC rules from the PCRF (IP-CAN session modification, clause 7.4.2), the PCC rules shall be activated, modified or removed as indicated by the PCRF.

The PCEF shall inform the PCRF about the outcome of a PCC rule operation. If network initiated procedures apply for the PCC rule and the corresponding IP-CAN bearer can not be established or modified to satisfy the bearer binding, then the PCEF shall reject the activation of a PCC rule.

NOTE 2: In case of a rejection of a PCC rule activation the PCRF may e.g. modify the attempted PCC rule, de-activate or modify other PCC rules and retry activation or abort the activation attempt and, if applicable, inform the AF that transmission resources are not available.

If network initiated procedures for IP-CAN bearer establishment apply this also includes provisioning the UE with traffic mapping information. See clause 6.1.9, Annex A and Annex D for details.

If another IP-CAN session is established by the same user, this is treated independently from the existing IP-CAN session.

To support the different LP-CAN bearer establishment modes (UE-only or UE/NW) the PCEF shall:
  forward the network and UE capabilities to the PCRF;
  apply the IP-CAN bearer establishment mode for the IP-CAN session set by the PCRF.

During an IP-CAN session modification, the PCEF shall provide information (belonging to the IP-CAN bearer established or modified) to the PCRF as follows:
  in UE-only bearer establishment mode, the PCEF shall send the full QoS and traffic mapping information;
  in UE/NW bearer establishment mode, the PCEF shall:
    at UE-initiated bearer establishment, send the full QoS and traffic mapping information;
    at UE-initiated bearer modification, send information on the requested change to QoS bitrates and changes to the traffic mapping information;
  at NW-initiated bearer establishment or modification, the PCEF shall not send any QoS or traffic mapping information.

When flow mobility as specified in TS 23.261 [23] applies, the PCEF shall provide IP flow mobility routing information to the PCRF as follows:
  the default route to be used if no explicit routing information for a service data flow is provided;
  the route for an IP flow.

The PCEF shall derive the routing information from the IP flow mobility flow bindings installed in the PCEF, as defined in TS 23.261 [23].

If there are events which can not be monitored in the PCEF, the PCEF shall provide the information about the required event triggers to the PCRF using the PCEF initiated IP-CAN Session Modification procedure, as defined in clause 7.4.1, or in the response to a PCRF initiated IP-CAN Session Modification, as defined in clause 7.4.3. If the triggers were provided by the OCS at credit authorization, it is an implementation option whether a successful confirmation is required from the PCRF in order for the PCEF to consider the credit (re-)authorization procedure to be successful.

IP-CAN-specific parameters may be sent by the PCRF to the PCEF or the PCEF to the PCRF. The IP-CAN Session Modification procedure may be used to deliver these parameters to allow interaction between the BBERF and the PCEF by way of the PCRF. This is required in accesses that require these parameters to be sent indirectly. The PCEF shall support usage monitoring as specified in clause 4.4.

The PCEF enhanced with TDF capabilities shall handle application traffic detection as per request from PCRF as well as report about the detected application traffic along with service flow descriptions, if available, to the PCRF, if requested by the PCRF.

******* Next Modified Section *****

6.4 IP-CAN Bearer and IP-CAN Session Related Policy Information

The purpose of the IP-CAN bearer and IP-CAN session related policy information is to provide policy and charging control related information that is applicable to a single IP-CAN bearer or the whole IP-CAN session respectively.

The PCRF provides the IP-CAN bearer and IP-CAN session related policy information to the PCEF and BBERF (if applicable) using the PCC rule and QoS rule (if applicable) provision procedure. The IP-CAN bearer related policy information may be provided together with rules or separately.

Table 6.4 lists the PCC related IP-CAN bearer and IP-CAN session related policy information.

TABLE 6.4

PCC related IP-CAN bearer and IP-CAN session related policy information

| Attribute | Description | PCRF permitted to modify the attribute | Scope |
|---|---|---|---|
| Charging information (NOTE 2) | Defines the containing OFCS and/or OCS addresses. | No | IP-CAN session |
| Default charging method (NOTE 2) | Defines the default charging method for the IP-CAN session. | No | IP-CAN session |
| Event trigger | Defines the event(s) that shall cause a re-request of PCC rules for the IP-CAN bearer. | Yes | IP-CAN session |
| Authorized QoS per bearer (UE-initiated IP-CAN bearer activation/modification) (NOTE 1) | Defines the authorised QoS for the IP-CAN bearer (QCI, GBR, MBR). | Yes | IP-CAN bearer |
| Authorized MBR per QCI (network initiated IP-CAN bearer activation/modification) (NOTE 1) (NOTE 3) | Defines the authorised MBR per QCI. | Yes | IP-CAN session |
| Revalidation time limit | Defines the time period within which the PCEF shall perform a PCC rules request. | Yes | IP-CAN session |
| Configuration option profile (Note 4) | Defines and points to a set of local predefined PCEF configuration to be used for IP address allocation/IP configuration and subsequent routing | No | IP-CAN session |

(NOTE 1): Depending on the bearer establishment mode only one Authorized QoS information has to be used.
(NOTE 2): These attributes should not be provided to BBERF.
(NOTE 3): This attribute is only applicable when the IP-CAN supports non-GBR bearers that have a separate MBR (e.g. for GPRS).
(Note 4): This attribute is to allow the PCRF to influence IP address allocation/IP configuration and subsequent IP routing in the PCEF for the case of standalone TDFs in accordance with end user consent in the User Privacy Policy.

Upon the initial interaction with the PCEF, the PCRF may provide Charging information containing OFCS and/or OCS addresses to the PCEF defining the offline and online charging system addresses respectively. These shall override any possible predefined addresses at the PCEF. If received by the PCEF, it supersedes the Primary OFCS/OCS address and Secondary OFCS/OCS address in the charging characteristics profile.

Upon the initial interaction with the PCEF, the PCRF may provide Default charging method indicating what charging method shall be used in the IP-CAN session for every PCC rule where the charging method identifier is omitted, including predefined. PCC rules that are activated by the PCEF. If received by the PCEF, it supersedes the Default charging method in the charging characteristics profile.

Upon the initial interaction with the PCEF and based on an indication from the PCEF, the PCRF shall provide the Configuration Option Profile indicating the set of local predefined configuration data that shall be used by the PCEF for IP address allocation/IP configuration and subsequent routing.

Upon every interaction with the ERF, the PCRF may provide event triggers for the IP-CAN session. Event triggers are used to determine which IP-CAN bearer modification causes the ERF to re-request PCC rules. The triggers are listed in clause 6.1.4.

The semantics of the authorized QoS per bearer (UE-initiated IP-CAN bearer activation/modification) and the authorized MBR per QCI (network initiated IP-CAN bearer activation/modification) are captured in clause 6.2.2.4.

The Revalidation time limit defines the time period within which the PCEF shall trigger a request for PCC rules for an established IP-CAN session.

******* Next Modified Section *****

7.2 IP-CAN Session Establishment

This clause describes the signalling flow for IP-CAN Session establishment as well as network prefix and/or IP address assignment to the UE. The AF is not involved.

This procedure concerns both roaming and non-roaming scenarios. In the roaming case when a Gateway Control Session is used, the V-PCRF should proxy the Gateway Control Session Establishment information between the BBERF in the VPLMN and the H-PCRF over S9 based on PDN-Id and roaming agreements.

For the Local Breakout scenario (FIG. 5.1-4) the V-PCRF shall proxy the Indication and Acknowledge of IP-CAN Session Establishment over S9 between the PCEF in the VPLMN and the H-PCRF. If the TDF is standalone, for the solicited application reporting, the V-PCRF shall provide functions to extract ADC rules from PCC rules provided by the H PCRF over S9. The V PCRF then provides updated PCC rules to the PCEF and ADC rules to the TDF, if appropriate.

In the non-roaming case (FIG. 5.1-1) the V-PCRF is not involved.

1. The BBERF initiates a Gateway Control Session Establishment procedure as defined in clause 7.7.1 (applicable for cases 2a during initial attach and 2b, as defined in clause 7.1).
2. The GW(PCEF) receives a request for IP-CAN Bearer establishment. A PDN Connection Identifier may be included in the request. The GW(PCEF) accepts the request and assigns an IP address and (if requested) network prefix for the user.
3. The PCEF determines that the PCC authorization is required, requests the authorization of allowed service (s) and PCC Rules information. The PCEF includes the following information: UE Identity (e.g. MN NAI), a PDN identifier (e.g. APN), the IP-CAN type and the IPv4 address and IPv6 network prefix, if available, the PDN Connection Identifier received for IP-CAN Bearer establishment and, if available, the default charging method and the IP-CAN bearer establishment modes supported and information on whether PCEF is enhanced with TDF functionality. It may also include the TDF IP address, in case of solicited application reporting, if applicable. The PDN identifier, IP address (es) and UE identity enables identification of the IP-CAN session. The IP-CAN Type identifies the type of access from which the IP-CAN session is established. If the service data flow is tunnelled at the BBERF, the PCEF shall provide information about the mobility protocol tunnelling encapsulation header. The PCEF may also include the Default Bearer QoS and APN-AMBR (applicable for case 1, as defined in clause 7.1). In case 2a the PCEF may also include charging ID information. If the GW/PCEF allocates a shorter IPv6 prefix for use with IPv6 Prefix Delegation, the GW/PCEF provides this shorter prefix as the IPv6 network prefix.

NOTE: In case of standalone TDF and solicited application reporting, either PCEF informs PCRF with TDF IP address, or PCRF has it preconfigured per each one of PCEFs.

4. If the PCRF does not have the subscriber's subscription related information, it sends a request to the SPR in order to receive the information related to the IP-CAN session. The PCRF provides the subscriber ID and, if applicable, the PDN identifier to the SPR. The PCRF may request notifications from the SPR on changes in the subscription information.
5. The PCRF stores the subscription related information containing the information about the allowed service (s), User Privacy Policy and PCC Rules information, and may include MPS EPS Priority, MPS Priority Level and IMS Signalling Priority for establishing a PS session with priority and may also include user profile configuration indicating whether application detection and control should be enabled for the IP-CAN session.
6. The PCRF makes the authorization and policy decision. If MPS EPS Priority, MPS Priority Level, and IMS Signalling Priority are present for the user, the PCRF takes the information into account.
7. If the TDF is standalone, for the solicited application reporting, the PCRF requests the TDF to establish the relevant session towards PCRF and provides Application Detection and Control Rules to the TDF, as per user profile configuration. The PCRF may also subscribe to the application detection start and application detection stop event triggers.
8. The TDF acknowledges the request and may indicate policy enforcement actions support in case some of the enforcement actions, required by PCRF, are not supported.
9. The PCRF sends the decision(s), including the chosen IP-CAN bearer establishment mode, to the PCEF. The GW(PCEF) enforces the decision. The PCRF may provide the default charging method and may include the following information: the PCC Rules to activate and the Event Triggers to report. The Policy and Charging Rules allow the enforcement of policy associated with the IP-CAN session and may allow the use of application traffic detection, as per user profile configuration, if PCEF is enhanced with TDF functionality. The Event Triggers indicate to the PCEF what events must be reported to the PCRF. If requested by the PCEF the Configuration Option Profile will be provided by the PCRF to ensure that IP address allocation/IP configuration and subsequent IP Routing with respect to standalone TDFs is in accordance with the User Privacy Policy.
10. If online charging is applicable, and at least one PCC rule was activated, the PCEF shall activate the online charging session, and provide relevant input information for the OCS decision. Depending on operator configuration PCEF may request credit from OCS for each charging key of the activated PCC rules.
11. If online charging is applicable the OCS provides the possible credit information to the PCEF and may provide re-authorisation triggers for each of the credits. In cases 2a and 2b if the OCS provides any re-authorisation trigger, which can not be monitored at the PCEF, the PCEF shall request PCRF to arrange those to be reported by the BBERF via the PCRF.
12. If at least one PCC rule was successfully activated and if online charging is applicable, and credit was not denied by the OCS, the GW (PCEF) acknowledges the IP-CAN Bearer Establishment Request.
13. If network control applies the GW may initiate the establishment of additional IP-CAN bearers. See Annex A and Annex D for details.
14. If the PCRF in step 7 requested an acknowledgement based on PCC rule operations, the GW (PCEF) sends the IP-CAN Session Establishment Acknowledgement to the PCRF in order to inform the PCRF of the activated PCC rules result.

******* End Modified Section *****

As cited earlier, whether PCRF-interaction before IP-Address allocation should be done or not can be configured in the GW, for example per APN, in order to avoid unnecessary signalling.

Embodiment No. 5: Gx Provided TDF Bypass Indication

Gx provided TDF bypass indication
  Gx provides a new "TDF bypass indication" from PCRF.
    This could be a flag and a TDF IP address when TDF is required.
  The solution can be viewed as a variant of TDF Routing Controlled by a policy server (i.e. referred herein as an "Aware Policy Based routing") that is optimized by NOT requiring the PCEF to perform packet inspection of the IP flow.
  Based on "TDF bypass indication" (instead of a Gx "Aware-Policy-based-Routing-Profile") from PCRF the GGSN-MPG/P-GW makes routing decisions on the Gi interface (for example, to send end user traffic) to stand alone TDF.
  In the GGSN/P-GW-MPG for a given APN there would also be configurations for a service APN in which TDF is not deployed as well service APN(s) where TDF(s) are deployed. The operator based on this configuration (and "TDF bypass indication" from PCRF) can control that the session IP flows are routed to one of the alternative routes (i.e. without a deployed TDF) by the use of Virtual Private Networks (VPNs) on the Gi side.
Benefits
  The operator PCRF/SPR server can utilize static subscription information (i.e. TDF Privacy policy) available to the PCRF infrastructure for choosing whether session IP flows undergo DPI.
  All handsets and data cards in the mobile fleet need only have only single APN configured, but traffic may transparently to the end-user be distributed over dedicated APNs which may or may not have TDF deployed.

Description
A given base APN (e.g. internet Access) is assigned to UE.
"Service APNs" are defined in GGSN/P-GW:
  e.g. Service APNs with TDF deployed
  Service APN without TDF deployed
At IP Can Establishment PCRF provides over Gx "TDF bypass Indication" leading to sending traffic towards appropriate Service APN.
GGSN/P-GW based on local configuration will determine to which Service APN end user packets are routed over Gi such that end user packets are subjected (or not) to any deployed TDF based on information provided by Gx.
GGSN/P-GW may also apply "NAT" (as per Aware Policy-Based Routing solution) to ensure that Service APNs have different address space allowing downlink (DL) packets to take same path as uplink (UL) packets (see embodiment no. 3).

Embodiment No. 6: TDF Applies "Permit Unrestricted"

TDF selected but PCRF always indicates "Permit Unrestricted"
  TR 23.813 provides for the following enforcement action that may be applied by a TDF:
  Permit Unrestricted—the detected service/flow is allowed to continue without further policy action.
  In the case TDF can not be bypassed then the PCRF could in the case of lack of user privacy consent for DPI always indicate "permit unrestricted" towards the TDF. The detected while still passing thru the TDF would not be affected by the DPI. The service would be not blocked, shaped or redirected.
  There may be legal implications as the TDF is not being bypassed only the enforcement actions are in effect being bypassed by permitting the detected service/flow to continue unaffected by the DPI.

Embodiment No. 7: Radius Assisted APN Selection Using PCRF Radius Proxy

The solution involves replacing the APN received over the "Gn" interface at PDP Context Request with an APN received in the Access-Request message via RADIUS or DIAMETER protocol.

The PCRF acting as a Radius or Diameter Proxy inserts a new RADIUS/DIAMETER AVP (e.g. User Privacy—DPI permitted Yes/No), as per profile setting in SPR, in the RADIUS/DIAMETER Access-Request.

This allows the AAA to utilize this new User Privacy AVP along with existing information for choosing the APN to use for a PDP context.

A detailed description of some steps of this solution is given below with reference to FIG. 10 which, for simplicity, only illustrates the RADIUS messages. The steps are as follows:
  steps 1-2: Illustrate signaling associated with an IP-CAN Bearer Request.
  step 3: Instead of immediately assigning an IP address, the PCEF is enhanced to use AAA functionality support in making decision regarding APN assignment Existing Access-Request containing subscriber identity and the expected APN (received over Gn (i.e. GTP)) is sent towards the AAA. The PCRF is enhanced to act as AAA Proxy thereby inserting itself in path between PCRF and the AAA and intercepts the Access Accept.
  steps 4-5: The PCRF retrieves PCC profile information from SPR which is now enhanced with User Privacy Policy.
  step 6: The PCRF extracts User privacy policy from profile information.
  step 7: The PCRF acting as a AAA proxy inserts a new User Privacy AVP before forwarding Access-Request to final destination AAA.
  step 8: The AAA is enhanced to use the received User Privacy AVP and assign an APN that is accordance with the user privacy. For example, if user consent has not been given for DPI the AAA would assign an APN on which TDFs have not been deployed.
  steps 9-10: The PCRF acting as a AAA proxy returns Access-Accept to the PCEF (i.e. GGSN/P-GW).
  step 11: The GW is enhanced to associate the subscriber with the APN received from the AAA. The GW allocates an IP address associated with the APN.
  step 12: The IP Can Establishment proceeds as per existing procedure.

Embodiment No. 8: Radius Assisted Local Pool Using PCRF Radius Proxy

This solution is of value for those APNs whose IP address space has been segmented and divided into various local IP address pools in a given gateway GW (e.g. a GGSN or P-GW implementing a PCEF functionality).

The special subnets in local pool can be defined such that address allocation from which would allow user traffic to bypass TDF.

The PCRF acting as a Radius or Diameter Proxy inserts a new RADIUS/DIAMETER AVP (e.g. User Privacy), as per profile setting in SPR, in the RADIUS/DIAMETER Access-Request.

This allows the AAA to utilize this new User Privacy AVP along with existing information for choosing the appropriate local Pool for address allocation to use for a PDP context
  Access Accept returns string name that identifies one subnet in a local pool:
  Framed-IP-Pool (for IPv4)
  Framed-IPv6-Pool (for IPv6)
  Note: It should be appreciated that one or more features described with respect to anyone of embodiment nos. 1-8 could be used in anyone of the other embodiment nos. 1-8.

From the foregoing, one can appreciate that the present invention enables the network to control, through subscriber profile data and/or policy preconfigured control data, whether deep packet inspection for data flow/s for an IP-CAN session established by an end user should take place, or not, according to a defined "User Privacy Policy", and, in the former case, to which TDF node the data flow(s) should be directed. In addition, one can appreciate that embodiment nos. 1-2 are relatively static methods which provide control via control in a Home Subscriber Server (HSS) or a Authentication Authorization Accounting (AAA) server through separate APN definitions, or separate IP address space within a given APN, are detailed. And, that embodiment nos. 3-8 provide a dynamic policy through a policy server (i.e. PCRF). In all the described embodiments, the PCRF controls the end user IP packet routing by providing a "configuration option" parameter downloaded to the PCEF, so that IP packet routing policies enforced therein comply to TDF related policies under PCRF/SPR control.

One basic control is that a "configuration option" parameter points to a set of specific GW configuration parameters on the GW (see embodiment no. 4). These parameters can include an APN and or Local IP address Pool resident on the concerned gateway GW (e.g. a GGSN or a P-GW implementing PCEF functionality) that should be used by the GW for end user IP address allocation purposes. This would lead to an IP address assignment such that an end user's packets would bypass (or not) the deployed standalone TDF functionality as per User Privacy Policy (in PCRF/SPR). The PCRF, preferably through additions to the standardized 3GPP "Gx" interface based in several of the embodiments disclosed herein, will indicate to the concerned gateway (e.g. a GGSN or a packet data network gateway, PDN-GW/P-GW) whether the TDF should be bypassed or not, and also through which specific externally deployed TDF node the traffic should be routed. The 3GPP specification TS 29.212 (e.g. V10.1.0; December 2010) discloses functional details of the "Gx" interface, and the corresponding messages exchanged across said interface according to the "Diameter" protocol. Furthermore, the solutions associated with embodiment nos. 7-8 use the PCRF as a Radius or Diameter Proxy (i.e. the PCRF behaves as a proxy agent according to Radius or Diameter protocols). In these solutions, the PCRF inserts a "User Privacy" indication before forwarding a Radius or Diameter message to the AAA. This allows the AAA to return an APN and or IP address Pool that would be returned to the GW and used for end user IP address allocation purposes.

The present invention has several advantages some of which are described below as follows:

TDF bypass that considers PCRF/SPR Privacy policy can be achieved by letting the PCRF impact the IP-address allocation/IP-configuration performed at IPCAN-session activation.
  Provides a routing-wise solution, with low impact in the standardized PCC architecture, that would work both in the up-link and the down-link direction and also both for IPv4 and IPv6.
Deep packet inspection is performed in accordance to end user privacy policy provisioned in PCRF/SPR.
The operator can based on configuration on per user basis provide for completely bypassing a TDF or provide routing to specific TDFs.
Control from the PCRF ensures that the scope of DPI is in accordance with DPI privacy policies in the PCRF/SPR.
Dynamic control over Gx can be provided at IP-CAN establishment or Modification.
Determination of Routing to bypass a TDF can be based on returning a "configuration option profile" parameter to the GW. This parameter points to a set of necessary configuration data in the GW (e.g. APN, local IP address pool). This general control from the PCRF can allow for deployment of other features beyond just TDF bypass based on user privacy. It can allow for other end user control for efficiency purposes. For example IP Multimedia Subsystem (IMS) users are deemed not required to undergo DPI they may be assigned an APN that bypasses TDF.
End-user terminal configuration is simplified as only one APN may be configured to end-user but may be overridden by the PCRF "configuration option profile" parameter.

Furthermore, the described solutions may be implemented in any appropriate type of telecommunication system supporting any suitable communication standards and using any suitable components. For instance, the example network may include one or more instances of user equipment (UEs) and one or more base stations capable of communicating with these UEs, along with any additional elements suitable to support communication between UEs or between a UE and another communication device (such as a landline telephone). A typical UE may be any communication device that includes any suitable combination of hardware and/or software. Similarly, base stations may represent network nodes that include any suitable combination of hardware and/or software.

An example UE may include a processor, a memory, a transceiver, and an antenna. In particular embodiments, some or all of the functionality described herein as being provided by mobile communication devices or other forms of UE may be provided by the UE processor executing instructions stored on a computer-readable medium. Alternative embodiments of the UE may include additional components that may be responsible for providing certain aspects of the UE's functionality, including any of the functionality described herein and/or any functionality necessary to support the solution described herein.

An example base station may include a processor, a memory, a transceiver, and an antenna. In particular embodiments, some or all of the functionality described herein as being provided by a mobile base station, a base station controller, a node B, an enhanced node B, and/or any other type of mobile communications node may be provided by the base station processor executing instructions stored on a computer-readable medium. Alternative embodiments of the base station may include additional components responsible for providing additional functionality, including any of the functionality identified herein and/or any functionality necessary to support the solution described herein.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

In one aspect, the present invention provides a network node (e.g., GW-PCEF) that participates in an IP-CAN session establishment within a telecommunications network. The network node configured to: (a) receive a user privacy policy of an end user, wherein the user privacy policy indicates whether or not data flows to and from a user equipment used by the end user are to be routed through a TDF node; and (b) utilize the user privacy policy during the IP-CAN session establishment to assign an IP address to the end user, wherein the assigned IP address ensures that the data flows to and from the user equipment are routed or not through the TDF node depending on the user privacy policy. There are eight embodiments on how the network node can perform (a) and (b) as follows:

In embodiment no. 1, the user privacy policy is provided by a HSS or an AAA, and wherein the user privacy policy indicates whether the end user is to be assigned an IP address which is associated with an APN or a separate IP address pool in which no TDF node is deployed or is associated with another APN or a separate IP address pool in which the TDF node is deployed.

In embodiment no. 2, the network node is configured to: partition an Access Point Name (APN) into separate IP address pools where one IP address pool has IP addresses that bypass the TDF node and another IP address pool has IP addresses that do not bypass the TDF node; and assign an IP address to the end user from one of the separate IP address pools to enforce the user privacy policy, wherein the assigned IP address is a source IP address which ensures that the data flows are routed or not through the TDF node depending on the user privacy policy.

In embodiment no. 3, the user privacy policy is received from a PCRF, and wherein the user privacy policy points to a particular service APN which either has the TDF node deployed in a path or does not have the TDF node deployed in the path depending on the user privacy policy.

In embodiment no. 4, the user privacy policy is received from a PCRF, and wherein the user privacy policy defines and points to a set of local predefined PCEF configuration data to be used for IP address allocation/IP configuration and subsequent routing with respect to standalone TDFs.

In embodiment no. 5, the user privacy policy is received from a PCRF, and wherein the user privacy policy provides a TDF bypass indication.

In embodiment no. 6, the user privacy policy is received from a PCRF, and wherein the user privacy policy has a permit unrestricted indicator which is used when the TDF node cannot be bypassed and the end user does not want the data flows to and from the user equipment to be routed through the TDF node, and wherein the permit unrestricted indicator indicates that the TDF node is to bypass enforcement actions of the data flows to and from the user equipment.

In embodiment no. 7, the user privacy policy is represented by an access-accept message which is received from a PCRF which obtained information about the user privacy policy by acting as a Radius or Diameter proxy and inserting a user privacy indication in an access-request message sent to an AAA which provided information about the user privacy policy, and wherein the access-accept message indicates an APN which is to be used when assigning the IP address to ensure that the data flows to and from the user equipment are routed or not through the TDF node depending on the user privacy policy.

In embodiment no. 8, the user privacy policy is represented by an access-accept message which is received from a PCRF which obtained information about the user privacy policy by acting as a Radius or Diameter proxy and inserting a user privacy indication in an access-request message sent to an AAA which provided information about the user privacy policy, and wherein the access-accept message indicates a local IP pool which is to be used when assigning the IP address to ensure that the data flows to and from the user equipment are routed or not through the TDF node depending on the user privacy policy.

Note: All of the standards and specification described herein also have their contents incorporated by reference herein.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

Appendix A (Embodiment No. 2—FIGS. 2A-2B)

A step-by-step discussion of the Combined GPRS/IMSI Attach procedure described in in section 6.5.3 of 3GPP TS 23.060 V 10.2.0 but enhanced to include a TDF Bypass Flag in step 7h (see FIG. 2) pursuant to embodiment no. 2 of the present invention is provided next.

1) In A/Gb mode, the MS initiates the attach procedure by the transmission of an Attach Request (IMSI or P-TMSI and old RAI, MS Radio Access Capability, MS Network Capability, CKSN, Attach Type, DRX Parameters, old P-TMSI Signature, additional P-TMSI, Voice domain preference and UE's usage setting) message to the SGSN. IMSI shall be included if the MS does not have a valid P-TMSI available, or, if the MS is configured to perform Attach with IMSI at PLMN change and is accessing a new PLMN. If the MS has a valid P-TMSI or a valid GUTI, then P-TMSI and the old RAI associated with P-TMSI shall be included. MS Radio Access Capability contains the MS's GPRS multislot capabilities, frequency bands, etc. as defined in TS 24.008 [13]. Attach Type indicates which type of attach is to be performed, i.e. GPRS attach only, GPRS Attach while already IMSI attached, or combined GPRS/IMSI attach. If the MS uses P-TMSI for identifying itself and if it has also stored its old P-TMSI Signature, then the MS shall include the old P-TMSI Signature in the Attach Request message.

For Iu mode, the MS initiates the attach procedure by the transmission of an Attach Request (IMSI or P-TMSI and old RAI, Core Network Classmark, KSI, Attach Type, old P-TMSI Signature, Follow On Request, DRX Parameters, additional P-TMSI) message to the SGSN. IMSI shall be included if the MS does not have a valid P-TMSI available or a valid GUTI. If the MS uses P-TMSI for identifying itself and if it has also stored its old P-TMSI Signature, then the MS shall include the old P-TMSI Signature in the Attach Request message. If the MS has a valid P-TMSI, then P-TMSI and the old RAI associated with P-TMSI shall be included. KSI shall be included if the MS has valid security parameters. Core Network Classmark is described in clause "MS Network Capability". The MS shall set "Follow On Request" if there is pending uplink traffic (signalling or user data). The SGSN may use, as an implementation option, the follow on request indication to release or keep the Iu connection after the completion of the GPRS Attach procedure. Attach Type indicates which type of attach is to be performed, i.e. GPRS attach only, GPRS Attach while already IMSI attached, or combined GPRS/IMSI attach.

In both A/Gb and Iu mode, the DRX Parameters contain information about DRX cycle length for GERAN, UTRAN and possibly other RATs, e.g. E-UTRAN.

If the MS initiates the Attach procedure at a CSG cell or a hybrid cell, the RAN indicates the CSG ID of the cell with the Attach Request message sent to the new SGSN. If the MS attaches via a hybrid cell, the RAN indicates the CSG access mode to the new SGSN. If the CSG access mode is not indicated but the CSG ID is indicated, the SGSN shall consider the cell as a CSG cell.

The E-UTRAN capable MS stores the TIN in detached state. If the MS's TIN indicates "P-TMSI" or "RAT related TMSI" and the MS holds a valid P-TMSI then the "old P-TMSI" IE indicates this valid P-TMSI. If the MS's TIN indicates "GUTI" and the MS holds a valid GUTI then the "old P-TMSI" IE indicates a P-TMSI mapped from the GUTI. If the UE has a valid NAS token, the truncated NAS token shall be included in the "old P-TMSI signature" IE as described in TS 33.401 [91]. Otherwise, an empty NAS token shall be included in the "old P-TMSI Signature" IE.

Mapping a GUTI to P-TMSI/RAI is specified in TS 23.003 [4]. If the MS holds a valid P-TMSI then the MS indicates the P-TMSI as additional P-TMSI, regardless whether the "old P-TMSI" IE also indicates this P-TMSI or a P-TMSI mapped from a GUTI.

The UE sets the voice domain preference and UE's usage setting according to its configuration, as described in clause 5.3.15.

For an Emergency Attach the MS shall indicate emergency service and the IMSI shall be included if the MS does not have a valid P-TMSI or a valid GUTI available. The IMEI shall be included when the MS has no valid IMSI, no valid P-TMSI and no valid GUTI. The UE shall set the "Follow On Request" to indicate that there is pending uplink traffic and the UE shall initiate the activation of an emergency PDP context after successful Emergency Attach.

If the SGSN is not configured to support Emergency Attach the SGSN shall reject any Attach Request that indicates emergency service.

2) If the MS identifies itself with P-TMSI and the SGSN has changed since detach, the new SGSN sends an Identification Request (P-TMSI, old RAI, old P-TMSI Signature) to the old SGSN (this could be an old MME) to request the IMSI. If the new SGSN provides functionality for Intra Domain Connection of RAN Nodes to Multiple CN Nodes, the new SGSN may derive the old SGSN from the old RAI and the old P-TMSI and send the Identification Request message to this old SGSN. Otherwise, the new SGSN derives the old SGSN from the old RAI. In any case the new SGSN will derive an SGSN that it believes is the old SGSN. This derived SGSN is itself the old SGSN, or it is associated with the same pool area as the actual old SGSN and it will determine the correct old SGSN from the P-TMSI and relay the message to that actual old SGSN. The old SGSN responds with Identification Response (IMSI, Authentication Triplets or Authentication Quintets). If the MS is not known in the old SGSN, the old SGSN responds with an appropriate error cause. The old SGSN also validates the old P-TMSI Signature and responds with an appropriate error cause if it does not match the value stored in the old SGSN. If the old SGSN is a MME and the truncated NAS token is included in the "old P-TMSI Signature" IE, this validation checks the NAS token as described in TS 33.401 [91].

For an Emergency Attach if the MS identifies itself with a temporary identity that is not known to the SGSN, the SGSN shall immediately request the IMSI from the MS. If the UE identifies itself with IMSI, the IMSI request shall be skipped.

3) If the MS is unknown in both the old and new SGSN, the SGSN sends an Identity Request (Identity Type=IMSI) to the MS. The MS responds with Identity Response (IMSI).

4) The authentication functions are defined in the clause "Security Function". If no MM context for the MS exists anywhere in the network, then authentication is mandatory. Ciphering procedures are described in clause "Security Function". If P-TMSI allocation is going to be done and the network supports ciphering, the network shall set the ciphering mode.

If the SGSN is configured to support Emergency Attach for unauthenticated IMSIs and the MS indicated emergency service, the SGSN skips the authentication and security setup or the SGSN accepts that the authentication may fail and continues the attach procedure. If the MS is emergency attached and not successfully authenticated, integrity protection and ciphering shall not be performed.

5) The equipment checking functions are defined in the clause "Identity Check Procedures". Equipment checking is optional.

For an Emergency Attach, the MS may have included the IMEI in the Attach Request message. If not, and the IMSI cannot be authenticated, the SGSN shall retrieve the IMEI from the MS.

For an Emergency Attach, the IMEI check to the EIR may be performed. If the IMEI is blocked, operator policies determine whether the Emergency Attach procedure continues or is stopped.

6) If there are active PDP contexts in the new SGSN for this particular MS (i.e. the MS re-attaches to the same SGSN without having properly detached before), the new SGSN deletes these PDP contexts by sending Delete PDP Context Request (TEID) messages to the GGSNs involved. The GGSNs acknowledge with Delete PDP Context Response (TEID) messages.

7) If the SGSN number has changed since the GPRS detach, or if it is the very first attach, or if the Automatic Device Detection (ADD) function is supported and the IMEISV has changed (see TS 22.101 [82] for ADD functional requirement), or if the MS provides an IMSI or the MS provides an old P-TMSI/RAI which doesn't point to a valid context in the SGSN, then the SGSN informs the HLR:

a) The SGSN sends an Update Location (SGSN Number, SGSN Address, IMSI, IMEISV, Update Type, Homogenous Support of LMS Over PS Sessions) to the HLR. IMEISV is sent if the ADD function is supported. Update Type indicates this if Attach procedure is set to "SGSN only registration". Homogenous Support of IMS Over PS Sessions indicates whether or not "IMS Voice over PS Sessions" is supported homogeneously in all RAs in the serving SGSN.

b) The HLR sends Cancel Location (IMSI, Cancellation Type) to the old SGSN. Also if the Update Type indicates Attach and the HSS has the MME registration, then the HSS sends Cancel Location (IMSI, Cancellation Type) to the old MME. The Cancellation Type indicates the old MME or SGSN to release the old Serving GW resource.

c) The old SGSN acknowledges with Cancel Location Ack (IMSI). If there are any ongoing procedures for that MS, the old SGSN shall wait until these procedures are finished before removing the MM and PDP contexts.

d) If there are active PDP contexts in the old SGSN for this particular MS, the old SGSN deletes these PDP contexts by sending Delete POP Context Request (TEID) messages to the GGSNs involved.

e) The GGSNs acknowledge with Delete PDP Context Response (TEID) messages.

f) The HLR sends Insert Subscriber Data (IMSI, Subscription Data, CSG subscription data for the PLMN) to the new SGSN. If the S6d interface is used between an S4-SGSN and HSS the message "Insert Subscriber Data" is not used. Instead, the Subscription Data is sent by HSS in the message Update Location Ack. (Step 7h).

If the MS initiates the Attach procedure at a CSG cell, the new SGSN shall check whether the CSG ID is contained in the CSG subscription and is not expired. If the CSG ID is not present or expired, the SGSN shall send an Attach Reject message to the MS with an appropriate cause value. The MS shall remove the CSG ID from its Allowed CSG list, if present.

g) The new SGSN validates the MS's presence in the (new) RA. If due to regional subscription restrictions or access restrictions (see TS 23.221 [80] and TS 23.008 [79]) e.g.

CSG restrictions, the MS is not allowed to attach in the RA, the SGSN rejects the Attach Request with an appropriate cause, and may return an Insert Subscriber Data Ack (IMSI, SGSN Area Restricted) message to the HLR. If subscription checking fails for other reasons, the SGSN rejects the Attach Request with an appropriate cause and returns an Insert Subscriber Data Ack (IMSI, Cause) message to the HLR. If the network supports the MOCN configuration for network sharing, the SGSN may, if the MS is not a 'Network Sharing Supporting MS', in this case decide to initiate redirection by sending a Reroute Command to the RNS, as described in TS 23.251 [83] instead of rejecting the Attach Request message. If all checks are successful then the SGSN constructs an MM context for the MS and returns an insert Subscriber Data Ack (IMSI) message to the HLR. If the S6d interface is used between S4-SGSN and HSS the message "Insert Subscriber Data Ack" is not used. Instead the subscription data check performed by S4-SGSN is done when the S4-SGSN has received the message "Update Location Ack" from HSS (Step 7h).

h) The HLR acknowledges the Update Location message by sending an Update Location Ack to the SGSN after the cancelling of old MM context and insertion of new MM context are finished. If the S6d interface is used the Update Location Ack messages includes the subscription Data. If the Update Location is rejected by the HLR, the SGSN rejects the Attach Request from the MS with an appropriate cause. If the network supports the MOCN configuration for network sharing, the SGSN may, if the MS is not a 'Network Sharing Supporting MS', in this case decide to initiate redirection by sending a Reroute Command to the RNS, as described in TS 23.251 [83] instead of rejecting the Attach Request message.

For an Emergency Attach in which the MS was not successfully authenticated, the SGSN shall not send an Update Location Request to the HLR.

For an Emergency Attach, the SGSN shall ignore any unsuccessful Update Location Ack from HLR and continue with the Attach procedure.

The HLR sends a TDF bypass flag pursuant to embodiment no. 2 of the present invention.

8) If Attach Type in step 1 indicated GPRS Attach while already IMSI attached, or combined GPRS/IMSI attached, then the VLR shall be updated if the Gs interface is installed. When the SGSN does not provide functionality for the Intra Domain Connection of RAN Nodes to Multiple CN Nodes, the VLR number is derived from the RAI. When the SGSN provides functionality for Intra Domain Connection of RAN Nodes to Multiple CN Nodes, the SGSN uses the RAI and a hash value from the IMSI to determine the VLR number. The SGSN starts the location update procedure towards the new MSC/VLR upon receipt of the first Insert Subscriber Data message from the HLR in step 6d). This operation marks the MS as GPRS-attached in the VLR.

a) The SGSN sends a Location Update Request (new LAI, IMSI, SGSN Number, Location Update Type) message to the VLR. Location Update Type shall indicate IMSI attach if Attach Type indicated combined GPRS/IMSI attach. Otherwise, Location Update Type shall indicate normal location update. The VLR creates an association with the SGSN by storing SGSN Number. In networks that support network sharing, the Location Update Request includes the identity of the selected core network operator if the SGSN has received this information from the RAN, as described in TS 23.251 [83].

b) If the LA update is inter-MSC, the new VLR sends Update Location (IMSI, new VLR) to the HLR.

c) If the LA update is inter-MSC, the HLR sends a Cancel Location (IMSI) to the old VLR.

d) The old VLR acknowledges with Cancel Location Ack (IMSI).

e) If the LA update is inter-MSC, the HLR sends Insert Subscriber Data (IMSI, subscriber data) to the new VLR. The subscriber data may contain the CSG subscription data for the PLMN.

f) The VLR acknowledges with Insert Subscriber Data Ack (IMSI).

g) After finishing the inter-MSC location update procedures, the HLR responds with Update Location Ack (IMSI) to the new VLR.

h) The VLR responds with Location Update Accept (VLR TMSI) to the SGSN.

9) The SGSN selects Radio Priority SMS, and sends an Attach Accept (P-TMSI, VLR TMSI, P-TMSI Signature, Radio Priority SMS, CMS voice over PS Session Supported Indication, Emergency Service Support indicator) message to the MS. P-TMSI is included if the SGSN allocates a new P-TMSI. The IMS voice over PS Session Supported Indication is set as described in clause 5.3.8.

The Emergency Service Support indicator informs the MS that Emergency PDP contexts are supported, i.e. the MS is allowed to request activation of emergency PDP contexts when needed.

When receiving the Attach Accept message the E-UTRAN capable UE shall set its TIN to "P-TMSI" as no ISR Activated is indicated at Attach.

If the attach is initiated by manual CSG selection via a CSG cell, the MS upon receiving the Attach Accept message at a CSG cell shall add the CSG ID of the cell where the MS has sent the Attach Request message to its Allowed CSG list if it is not already present. Manual CSG selection is not supported when an emergency service has been initiated.

If the MS initiates the Attach procedure at a hybrid mode CSG cell, the SGSN shall check whether the CSG ID is contained in the CSG subscription and is not expired. The SGSN shall send an indication whether the UE is a CSG member to the RAN along with the RANAP message. Based on this information the RAN may perform differentiated treatment for CSG and non-CSG members.

NOTE 3: If the MS receives a Attach Accept message via a hybrid cell, the MS does not add the corresponding CSG ID to its Allowed CSG list. Adding a CSG ID to the MS's Allowed CSG list for a hybrid cell is performed only by OTA or OMA DM procedures.

10) If P-TMSI or VLR TMSI was changed, the MS acknowledges the received TMSI(s) by returning an Attach Complete message to the SGSN.

11) If VLR TMSI was changed, the SGSN confirms the VLR TMSI re-allocation by sending a TMSI Reallocation Complete message to the VLR.

NOTE 1: All steps except steps 6 and 7d, 7e are common for architecture variants using Gn/Gp based interaction with GGSN and using S4-based interaction with S-GW and P-GW. For an S4-based interaction with S-GW and P-GW, procedure steps (A) are defined in clause 6.5.3A and procedure steps (B) are defined in clause 6.5.3B.

NOTE 2: For an Emergency Attach in which the MS was not successfully authenticated, steps 6, 7, 8 and 11 are not performed.

Appendix B (Embodiment No. 2—FIGS. 3A-3C)

A step-by-step discussion of the Attach procedure described in section 5.3.2 of 3GPP TS 23.401 V10.2.1 but enhanced to include a TDF Bypass Flag in step 711 (see FIGS. 3A-3C) pursuant to embodiment no. 2 of the present invention is provided next.

A UE/user needs to register with the network to receive services that require registration. This registration is described as Network Attachment. The always-on IP connectivity for UE/users of the EPS is enabled by establishing a default EPS bearer during Network Attachment. The PCC rules applied to the default EPS bearer may be predefined in the PDN GW and activated in the attachment by the PDN GW itself. The Attach procedure may trigger one or multiple Dedicated Bearer Establishment procedures to establish dedicated EPS bearer(s) for that UE. During the attach procedure, the UE may request for an IP address allocation. Terminals utilizing only IETF based mechanisms for IP address allocation are also supported.

During the Initial Attach procedure the Mobile Equipment Identity is obtained from the UE. The MME operator may check the ME Identity with an EIR. At least in roaming situations, the MME should pass the ME Identity to the HSS, and, if a PDN GW outside of the VPLMN, should pass the ME Identity to the PDN GW.

The E-UTRAN Initial Attach procedure is used for Emergency Attach by UEs that need to perform emergency services but cannot gain normal services from the network. These UEs are in limited service state as defined in TS 23.122 [10]. Also UEs that had attached for normal services and do not have emergency bearers established and are camped on a cell in limited service state (e.g. restricted Tracking Area or not allowed CSG) shall initiate the Attach procedures indicating that the attach is to receive emergency services. UEs that camp normally on a cell, i.e. UEs that are not in limited service state, should initiate normal initial attach when not already attached and shall initiate the UE Requested PDN Connectivity procedure to receive emergency EPS bearer services.

NOTE 1: A UE that is emergency attached performs initial attach procedure before being able to obtain normal services.

In order to limit load on the network, only when performing an E-UTRAN Attach with a new PLMN (i.e. not the registered PLMN or an equivalent PLMN of the registered PLMN), a UE configured to perform Attach with IMSI at PLMN change (see TS 24.368 [69]) shall identify itself by its IMSI instead of any stored temporary identifier. This procedure is also used to establish the first PDN connection over E-UTRAN when the UE already has active PDN connections over a non-3GPP access network and wants to establish simultaneous PDN connections to different APNs over multiple accesses.

NOTE 2: For a PMIP-based S5/S8, procedure steps (A), (B), and (C) are defined in TS 23.402 [2]. Steps 7, 10, 13, 14, 15 and 23a/b concern GTP based S5/S8.

NOTE 3: The Serving GWs and PDN GWs involved in steps 7 and/or 10 may be different to those in steps 13-15.

NOTE 4: The steps in (D) are executed only upon handover from non-3GPP access.

NOTE 5: More detail on procedure steps (E) is defined in the procedure steps (B) in clause 5.3.8.3.

NOTE 6: More detail on procedure steps (F) is defined in the procedure steps (B) in clause 5.3.8.4.

1. The UE initiates the Attach procedure by the transmission, to the eNodeB, of an Attach Request (IMSI or old GUTI, last visited TAI (if available), UE Core Network Capability, UE Specific DRX parameters, Attach Type, ESM message container (Request Type, PDN Type, Protocol Configuration Options, Ciphered Options Transfer Flag), $KSI_{ASME}$, NAS sequence number, NAS-MAC, additional GUTI, P-TMSI signature, Voice domain preference and UE's usage setting) message together with RRC parameters indicating the Selected Network and the old GUMMEI. The old GUTI may be derived from a P-TMSI and RAI. IMSI shall be included if the UE does not have a valid GUTI or a valid P-TMSI available, or if the UE is configured to perform Attach with IMSI at PLMN change and is accessing a new PLMN. The UE stores the TIN in detached state. If the UE's TIN indicates "GUTI" or "RAT-related TMSI" and the UE holds a valid GUTI then the old GUTI indicates this valid GUTI. If the UE's TIN indicates "P-TMSI" and the UE holds a valid P-TMSI and related RAI then these two elements are indicated as the old GUTI. Mapping a P-TMSI and RAI to a GUTI is specified in TS 23.003 [9]. If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI and the UE has a valid P-TMSI signature associated to it, the P-TMSI signature shall be included. The UE sets the voice domain preference and UE's usage setting according to its configuration, as described in clause 4.3.5.9.

If available, the last visited TAI shall be included in order to help the MME produce a good list of TAIs for any subsequent Attach Accept message. Selected Network indicates the PLMN that is selected for network sharing purposes. The RRC parameter "old GUMMEI" takes its value from the "old GUTI" contained in the Attach Request. UE Network Capability is described in UE capabilities, see clause 5.11.

If the UE has valid security parameters, the Attach Request message shall be integrity protected by the NAS-MAC in order to allow validation of the UE by the MME. $KSI_{ASME}$, NAS sequence number and NAS-MAC are included if the UE has valid EPS security parameters. NAS sequence number indicates the sequential number of the NAS message. If the UE does not have a valid EPS security association, then the Attach Request message is not integrity protected. In this case the security association is established in step 5a. The UE network capabilities indicate also the supported NAS and AS security algorithms. PDN type indicates the requested IP version (IPv4, IPv4/IPv6, IPv6). Protocol Configuration Options (PCO) are used to transfer parameters between the UE and the PDN GW, and are sent transparently through the MME and the Serving GW. The Protocol Configuration Options may include the Address Allocation Preference indicating that the UE prefers to obtain an IPv4 address only after the default bearer activation by means of DHCPv4. If the UE intends to send PCO which require ciphering (e.g., PAP/CHAP usernames and passwords) or send an APN, or both, the UE shall set the Ciphered Options Transfer Flag and send PCO or APN or both only after authentication and NAS security setup have been completed (see below). If the UE has UTRAN or GERAN capabilities, it shall send the NRSU in the PCO to indicate the support of the network requested bearer control in UTRAN/GERAN. Request Type is included in the ESM message container and indicates "Handover" when the UE has already an activated PDN GW/HA due to mobility with non-3GPP accesses. Attach Type indicates whether it is an EPS attach or a combined EPS/IMSI attach or an Emergency Attach.

For an Emergency Attach the UE shall set both the Attach Type and the Request Type to "Emergency" and the IMSI shall be included if the UE does not have a valid GUTI or a valid P-TMSI available. The IMEI shall be included when the UE has no IMSI, no valid GUTI and no valid P-TMSI.

2. The eNodeB derives the MME from the RRC parameters carrying the old GUMMEI and the indicated Selected Network. If that MME is not associated with the eNodeB or the old GUMMEI is not available, the eNodeB selects an MME as described in clause 4.3.8.3 on "MME selection function". The eNodeB forwards the Attach Request message to the new MME contained in a S1-MME control message (Initial UE message) together with the Selected Network, CSG access mode, CSG ID, TAI+ECGI of the cell from where it received the message to the new MME. CSG ID is provided if the UE attaches via a CSG cell or hybrid cell. CSG access mode is provided if the UE attaches via a hybrid cell. If the CSG access mode is not provided but the CSG ID is provided, the MME shall consider the cell as a CSG cell. If the eNodeB has a collocated L-GW, it includes the L-GW address in the Initial UE message to the MME.

If the MME is not configured to support Emergency Attach the MME shall reject any Attach Request that indicates Attach Type "Emergency".

3. If the UE identifies itself with GUTI and the MME has changed since detach, the new MME uses the GUTI received from the UE to derive the old MME/SGSN address, and send an Identification Request (old GUTI, complete Attach Request message) to the old MME/SGSN to request the IMSI. If the request is sent to an old MME, the old MME first verifies the Attach Request message by NAS MAC and then responds with Identification Response (IMSI, MM Context). If the request is sent to an old SGSN, the old SGSN first verifies the Attach Request message by the P-TMSI signature and then responds with Identification Response (MM Context). If the UE is not known in the old MME/SGSN or if the integrity check or P-TMSI signature check for the Attach Request message fails, the old MME/SGSN responds with an appropriate error cause. The MM context contains security related information as well as other parameters (including IMSI) as described in clause 5.7.2 (Information Storage for MME).

The additional GUTI in the Attach Request message allows the new MME to find any already existing UE context stored in the new MME when the old GUTI indicates a value mapped from a P-TMSI and RAI.

For an Emergency Attach if the UE identifies itself with a temporary identity that is not known to the MME the MME immediately requests the IMSI from the UE. If the UE identifies itself with IMEI, the IMSI request shall be skipped.

NOTE 7: A SGSN always responds with the UMTS security parameters and the MME may store it for later use.

4. If the UE is unknown in both the old MME/SGSN and new MME, the new MME sends an Identity Request to the UE to request the IMSI. The UE responds with Identity Response (IMSI).

5a If no UE context for the UE exists anywhere in the network, if the Attach Request (sent in step 1) was not integrity protected, or if the check of the integrity failed, then authentication and NAS security setup to activate integrity protection and NAS ciphering are mandatory. Otherwise it is optional. If NAS security algorithm is to be changed, the NAS security setup is performed in this step. The authentication and NAS security setup functions are defined in clause 5.3.10 on "Security Function".

If the MME is configured to support Emergency Attach for unauthenticated IMSIs and the UE indicated Attach Type "Emergency" the MME skips the authentication and security setup or the MME accepts that the authentication may fail and continues the attach procedure.

After step 5a, all NAS messages shall be protected by the NAS security functions (integrity and ciphering) indicated by the MME unless the UE is emergency attached and not successfully authenticated.

5b. The ME Identity shall be retrieved from the UE. The ME identity shall be transferred encrypted unless the UE performs Emergency Attach and cannot be authenticated.

For an Emergency Attach, the UE may have included the IMEI in the Emergency Attach. If so, the ME Identity retrieval is skipped.

In order to minimise signalling delays, the retrieval of the ME Identity may be combined with NAS security setup in step 5a. The MME may send the ME Identity Check Request (ME Identity, IMSI) to the EIR. The EIR shall respond with ME Identity Check Ack (Result). Dependent upon the Result, the MME decides whether to continue with this Attach procedure or to reject the UE.

For an Emergency Attach, the IMEI check to the EIR may be performed. If the IMEI is blocked, operator policies determine whether the Emergency Attach procedure continues or is stopped.

6. If the UE has set the Ciphered Options Transfer Flag in the Attach Request message, the Ciphered Options i.e. PCO or APN or both, shall now be retrieved from the UE.

In order to handle situations where the UE may have subscriptions to multiple PDNs, if the Protocol Configuration Options contains user credentials (e.g. user name/password within PAP or CHAP parameters) then the UE should also send the APN to the MME.

7. If there are active bearer contexts in the new MME for this particular UE (i.e. the UE re-attaches to the same MME without having properly detached before), the new MME deletes these bearer contexts by sending Delete Session Request (LBI) messages to the GWs involved. The GWs acknowledge with Delete Session Response (Cause) message. If a PCRF is deployed, the PDN GW employs an IP-CAN Session Termination procedure to indicate that resources have been released.

8. If the MME has changed since the last detach, or if there is no valid subscription context for the UE in the MME, or if the ME identity has changed, or if the UE provides an IMSI or the UE provides an old GUTI which doesn't refer to a valid context in the MME, the MME sends an Update Location Request (MME Identity, IMSI, ME Identity, MME Capabilities, ULR-Flags, Homogeneous Support of IMS Over PS Sessions) message to the HSS. The MME capabilities indicate the MME's support for regional access restrictions functionality. ULR-Flags indicates "Initial-Attach-Indicator" as this is an Attach procedure. Homogenous Support of IMS Over PS Sessions indicates whether or not "IMS Voice over PS Sessions" is supported homogeneously in all TAs in the serving MME.

For an Emergency Attach in which the UE was not successfully authenticated, the MME shall not send an Update Location Request to the HSS.

9. The HSS sends Cancel Location (IMSI, Cancellation Type) to the old MME. The old MME acknowledges with Cancel Location Ack (IMSI) and removes the MM and bearer contexts. If the ULR-Flags indicates "Initial-Attach-Indicator" and the HSS has the SGSN registration, then the HSS sends Cancel Location (IMSI, Cancellation Type) to the old SGSN. The Cancellation Type indicates the old MME/SGSN to release the old Serving GW resource.

10. If there are active bearer contexts in the old MME/SGSN for this particular UE, the old MME/SGSN deletes these bearer contexts by sending Delete Session Request (LBI) messages to the GWs involved. The GWs return Delete Session Response (Cause) message to the old MME/SGSN. If a PCRF is deployed, the PDN GW employs an IP-CAN Session Termination procedure as defined in TS 23.203 [6] to to indicate that resources have been released.

11. The HSS acknowledges the Update Location message by sending an Update Location Ack (IMSI, Subscription data) message to the new MME. The Subscription Data contain one or more PDN subscription contexts. Each PDN subscription context contains an 'EPS subscribed QoS profile' and the subscribed APN-AMBR (see clause 4.7.3). The new MME validates the UE's presence in the (new) TA. If due to regional subscription restrictions or access restrictions (e.g. CSG restrictions) the UE is not allowed to attach in the TA or due to subscription checking fails for other reasons, the new MME rejects the Attach Request with an appropriate cause. If all checks are successful then the new MME constructs a context for the UE. If the APN provided by the UE is not allowed by subscription, or the Update Location is rejected by the HSS, the new MME rejects the Attach Request from the UE with an appropriate cause.

The Subscription Data may contain CSG subscription information. If the UE provided APN is authorized for LIPA according to the user subscription, the MMB shall use the CSG Subscription Data to authorize the connection.

For an Emergency Attach the MME shall not check for access restrictions, regional restrictions or subscription restrictions (e.g. CSG restrictions). For an Emergency Attach, the MME shall ignore any unsuccessful Update Location Response from HSS and continue with the Attach procedure.

The HSS sends a TDF bypass flag pursuant to embodiment no. 2 of the present invention.

12. For an Emergency Attach the MME applies the parameters from MME Emergency Configuration Data for the emergency bearer establishment performed in this step and any potentially stored IMSI related subscription data are ignored by the MME.

If the UE performs Initial or Handover Attach via a CSG cell and there is no subscription for that CSG or the CSG subscription is expired the MME shall reject the Attach Request with an appropriate cause. If the UE has this CSG ID on its Allowed CSG list the UE shall remove the CSG ID from the list when receiving this reject cause.

If a subscribed PDN address is allocated for the UE for this APN, the PDN subscription context contains the UE's IPv4 address and/or the IPv6 prefix and optionally the PDN GW identity. If the PDN subscription context contains a subscribed IPv4 address and/or IPv6 prefix, the MME indicates it in the PDN address. For Request Type indicating "Initial request", if the UE does not provide an APN, the MME shall use the PDN GW corresponding to the default APN for default bearer activation. If the UE provides an APN, this APN shall be employed for default bearer activation. For Request Type indicating "Handover", if the UE provides an APN, the MME shall use the PDN GW corresponding to the provided APN for default bearer activation, If the UE does not provide an APN, and the subscription context from HSS contains a PDN GW identity corresponding to the default APN, the MME shall use the PDN GW corresponding to the default APN for default bearer activation. The case where the Request Type indicates "Handover" and the UE does not provide an APN, and the subscription context from HSS does not contain a PDN GW identity corresponding to the default APN constitutes an error case. If the Request Type indicates "Initial request" and the selected PDN subscription context contains no PDN GW identity the new MME selects a PDN GW as described in clause 4.3.8.1 on PDN GW selection function (3GPP accesses). If the PDN subscription context contains a dynamically allocated PDN GW identity and the Request Type does not indicate "Handover" the MME may select a new PDN GW as described in clause PDN GW selection function, e.g. to allocate a PDN GW that allows for more efficient routing.

For initial and handover Emergency Attach the MME uses the PDN GW Selection function defined in Section 4.3.12.4 to select a PDN GW.

The new MME selects a Serving GW as described in clause 4.3.8.2 on Serving GW selection function and allocates an EPS Bearer Identity for the Default Bearer associated with the UE. Then it sends a Create Session Request (IMSI, MSISDN, MME TEID for control plane, PDN GW address, PDN Address, APN, RAT type, Default EPS Bearer QoS, PDN Type, APN-AMBR, EPS Bearer Identity, Protocol Configuration Options, Handover Indication, ME Identity, User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8, Serving Network) message to the selected Serving GW. User CSG Information includes CSG ID, access mode and CSG membership indication.

If the Request Type indicates "Emergency", Maximum APN restriction control shall not be performed.

For emergency attached UEs IMSI is included if available and if the IMSI cannot be authenticated then the IMSI shall be marked as unauthenticated.

The RAT type is provided in this message for the later PCC decision. The subscribed APN-AMBR for the APN is also provided in this message. The MSISDN is included if provided in the subscription data from the HSS. Handover indication is included if the Request Type indicates handover. Selection Mode indicates whether a subscribed APN was selected, or a non-subscribed APN sent by the UE was selected. Charging Characteristics indicates which kind of charging the bearer context is liable for. The MME may change the requested PDN type according to the subscription data for this APN as described in clause 5.3.1.1. The MME shall set the Dual Address Bearer Flag when the PDN type is set to IPv4v6 and all SGSNs which the UE may be handed over to are Release 8 or above supporting dual addressing, which is determined based on node pre-configuration by the operator. The Protocol Type over S5/S8 is provided to Serving GW which protocol should be used over S5/S8 interface.

The charging characteristics for the PS subscription and individually subscribed APNs as well as the way of handling Charging Characteristics and whether to send them or not to the P-GW is defined in TS 32.251 [44]. The MME shall include Trace Reference, Trace Type, Trigger Id, and OMC Identity if S-GW and/or P-GW trace is activated. The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type (see clause 15.4 of TS 23.060 [7]). If the P-GW receives the Maximum APN Restriction, then the P-GW shall check if the Maximum APN Restriction value does not conflict with the APN Restriction value associated with this bearer context request. If there is no conflict the request shall be allowed, otherwise the request shall be rejected with sending an appropriate error cause to the UE.

13. The Serving GW creates a new entry in its EPS Bearer table and sends a Create Session Request (IMSI, MSISDN, APN, Serving GW Address for the user plane, Serving GW TEID of the user plane, Serving GW TEID of the control plane, RAT type, Default EPS Bearer QoS, PDN Type, PDN Address, subscribed APN-AMBR, EPS Bearer Identity, Protocol Configuration Options, Handover Indication, ME Identity, User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, Serving Network) message to the PDN GW indicated by the PDN GW address received in the previous step. After this step, the Serving GW buffers any downlink packets it may receive from the PDN GW without sending a Downlink Data Notification message to the MME until it receives the Modify Bearer Request message in step 23 below. The MSISDN is included if received from the MME.

If the Request Type indicates "Emergency", Maximum APN restriction control shall not be performed.

For emergency attached UEs IMSI is included if available and if the IMSI cannot be authenticated then the IMSI shall be marked as unauthenticated.

14. If dynamic PCC is deployed and the Handover Indication is not present, the PDN GW performs an IP-CAN Session Establishment procedure as defined in TS 23.203 [6], and thereby obtains the default PCC rules for the UE. This may lead to the establishment of a number of dedicated bearers following the procedures defined in clause 5.4.1 in association with the establishment of the default bearer, which is described in Annex F.

The IMSI, APN, UE IP address, User Location Information (ECGI), UE Time Zone, Serving Network, RAT type, APN-AMBR, Default EPS Bearer QoS are provided to the PCRF by the PDN GW if received by the previous message. The User Location Information and UE Time Zone are used for location based charging. For emergency attached UEs which are unauthenticated the PDN GW provides the IMEI as the UE Identity instead of IMSI, to the PCRF.

The PCRF may modify the APN-AMBR and the QoS parameters (QCI and ARP) associated with the default bearer in the response, to the PDN GW as defined in TS 23.203 [6].

If the PCC is configured to support emergency services and if dynamic PCC is deployed, the PCRF, based on the emergency APN, sets the ARP of the PCC rules to a value that is reserved for emergency services and the authorization of dynamic PCC rules as described in of TS 23.203 [6]. If dynamic PCC is not deployed, the PDN GW uses the ARP of the default emergency EPS bearer for any potentially initiated dedicated emergency EPS bearer. The P-GW determines that emergency services are requested based on the emergency APN received in Create Session Request message.

NOTE 8: While the PDN GW/PCEF may be configured to activate predefined PCC rules for the default bearer, the interaction with the PCRF is still required to provide e.g. the UE IP address information to the PCRF.

NOTE 9: If the IP address is not available when the PDN GW performs the IP-CAN Session Establishment procedure with the PCRF, the PDN GW initiates an IP-CAN Session Modification procedure to inform the PCRF about an allocated IP address as soon as the address is available. In this version of the specification, this is applicable only to IPv4 address allocation.

If dynamic PCC is deployed and the Handover Indication is present, the PDN GW executes a PCEF Initiated IP-CAN Session Modification procedure with the PCRF as specified in TS 23.203 [6] to report the new IP-CAN type. Depending on the active PCC rules, the establishment of dedicated bearers for the UE may be required. The establishment of those bearers shall take place in combination with the default bearer activation as described in Annex F. This procedure can continue without waiting for a PCRF response. If changes to the active PCC rules are required, the PCRF may provide them after the handover procedure is finished.

In both cases (Handover Indication is present or not), if dynamic PCC is not deployed, the PDN GW may apply local QoS policy. This may lead to the establishment of a number of dedicated bearers for the UE following the procedures defined in clause 5.4.1 in combination with the establishment of the default bearer, which is described in Annex F.

If the CSG information reporting triggers are received from the PCRF, the PDN GW should set the CSG Information Reporting Action IE accordingly.

15. The P-GW creates a new entry in its EPS bearer context table and generates a Charging Id. The new entry allows the P-GW to route user plane PDUs between the S-GW and the packet data network, and to start charging. The way the P-GW handles Charging Characteristics that it may have received is defined in TS 32.251 [44].

The PDN GW returns a Create Session Response (PDN GW Address for the user plane, PDN GW TEID of the user plane, PDN GW TEID of the control plane, PDN Type, PDN Address, EPS Bearer Identity, EPS Bearer QoS, Protocol Configuration Options, Charging Id, Prohibit Payload Compression, APN Restriction, Cause, MS Info Change Reporting Action (Start) (if the PDN GW decides to receive UE's location information during the session), CSG Information Reporting Action (Start) (if the PDN GW decides to receive UE's User CSG information during the session), APN-AMBR) message to the Serving GW. The PDN GW takes into account the received PDN type, the Dual Address Bearer Flag and the policies of operator when the PDN GW selects the PDN type to be used as follows. If the received PDN type is IPv4v6 and both IPv4 and IPv6 addressing is possible in the PDN but the Dual Address Bearer Flag is not set, or only single IP version addressing for this APN is possible in the PDN, the PDN GW selects a single IP version (either IPv4 or IPv6). If the received PDN type is IPv4 or IPv6, the PDN GW uses the received PDN type if it is supported in the PDN, otherwise an appropriate error cause will be returned. The PDN GW allocates a PDN Address according to the selected PDN type. If the PDN GW has selected a PDN type different from the received PDN Type, the PDN GW indicates together with the PDN type IE a reason cause to the UE why the PDN type has been modified, as described in clause 5.3.1.1. PDN Address may contain an IPv4 address for IPv4 and/or an IPv6 prefix and an Interface Identifier. If the PDN has been configured by the operator so that the PDN addresses for the requested APN shall be allocated by usage of DHCPv4 only, or if the PDN GW allows the UE to use DHCPv4 for address allocation according to the Address Allocation Preference received from the UE, the PDN Address shall be set to 0.0.0.0, indicating that the IPv4 PDN address shall be negotiated by the UE with DHCPv4 after completion of the Default Bearer Activation procedure. For external PDN addressing for IPv6, the PDN GW obtains the IPv6 prefix from the external PDN using either RADIUS or Diameter client function. In the PDN Address field of the Create Session Response, the PDN GW includes the Interface Identifier and IPv6 prefix. The PDN GW sends Router Advertisement to the UE after default bearer establishment with the IPv6 prefix information for all cases.

If the PDN address is contained in the Create Session Request, the PDN GW shall allocate the IPv4 address and/or IPv6 prefix contained in the PDN address to the UE. The IP address allocation details are described in clause 5.3.1 on "IP Address Allocation". The PDN GW derives the BCM based on the NRSU and operator policy. Protocol Configuration Options contains the BCM as well as optional PDN parameters that the P-GW may transfer to the UE. These optional PDN parameters may be requested by the UE, or may be sent unsolicited by the P-GW. Protocol Configuration Options are sent transparently through the MME.

When the Handover Indication is present, the PDN GW does not yet send downlink packets to the S-GW; the downlink path is to be switched at step 23a.

If the PDN GW is an L-GW, it does not forward downlink packets to the S-GW. The packets will only be forwarded to the HeNB at step 20 via the direct user plane path.

16. If the MS Info Change Reporting Action (Start) and/or the CSG Information Reporting Action (Start) are received for this bearer context, then the S-GW shall store this for the bearer context and the S-GW shall report to that P-GW whenever a UE's location and/or User CSG information change occurs that meets the P-GW request, as described in clause 15.1.1a of TS 23.060 [7].

The Serving GW returns a Create Session Response (PDN Type, PDN Address, Serving GW address for User Plane, Serving GW TEID for S1-U User Plane, Serving GW TEID for control plane, EPS Bearer Identity, EPS Bearer QoS, PDN GW addresses and TEIDs (GTP-based S5/S8) or GRE keys (PMIP-based S5/S8) at the PDN GW(s) for uplink traffic, Protocol Configuration Options, Prohibit Payload Compression, APN Restriction, Cause, MS Info Change Reporting Action (Start), CSG Information Reporting Action (Start), APN-AMBR) message to the new MME.

17. If an APN Restriction is received, then the MME shall store this value for the Bearer Context and the MME shall check this received value with the stored value for the Maximum APN Restriction to ensure there are no conflicts between values. If the Bearer Context is accepted, the MME shall determine a (new) value for the Maximum APN Restriction. If there is no previously stored value for Maximum APN Restriction, then the Maximum APN Restriction shall be set to the value of the received APN Restriction. MME shall not deactivate bearer(s) with emergency ARP, if present, to maintain valid APN restriction combination.

The P-GW shall ignore Maximum APN restriction if the request includes the Emergency APN.

If the MS Info Change Reporting Action (Start) and/or the CSG Information Reporting Action (Start) are received for this bearer context, then the MME shall store this for the bearer context and the MME shall report whenever a UE's location and/or User CSG information change occurs that meets the request, as described in clause 15.1.1a of TS 23.060 [7].

The MME determines the UE AMBR to be used by the eNodeB based on the subscribed UE-AMBR and the APN-AMBR for the default APN, see clause 4.7.3.

For emergency attach the MME determines the UE-AMBR to be used by the eNodeB from the APN AMBR received from the S-GW.

The new MME sends an Attach Accept (APN, GUTI, PDN Type, PDN Address, TAI List, EPS Bearer Identity, Session Management Request, Protocol Configuration Options, NAS sequence number, NAS-MAC, IMS Voice over PS session supported Indication, Emergency Service Support indicator, LCS Support Indication) message to the eNodeB.

GUTI is included if the new MME allocates a new GUTI. This message is contained in an S1_MME control message Initial Context Setup Request. This S1 control message also includes the AS security context information for the UE, the Handover Restriction List, the EPS Bearer QoS, the UE-AMBR, EPS Bearer Identity, as well as the TEID at the Serving GW used for user plane and the address of the Serving GW for user plane. In addition, if the PDN connection is established for Local IP Access, the S1 control message includes a Correlation ID for enabling the direct user plane path between the HeNB and the L-GW.

NOTE 10: In this release of the 3GPP specification the Correlation ID is set equal to the user plane PDN GW TEID (GTP-based S5) or GRE key (PMIP-based S5) that the MME has received in step 16.

In the Attach Accept message, the MME does not include the IPv6 prefix within the PDN Address. The MME includes the EPS Bearer QoS parameter QCI and APN-AMBR into the Session Management Request. Furthermore, if the UE has UTRAN or GERAN capabilities and the network supports mobility to UTRAN or GERAN, the MME uses the EPS bearer QoS information to derive the corresponding PDP context parameters QoS Negotiated (R99 QoS profile), Radio Priority, Packet Flow Id and TI and includes them in the Session Management Request. If the UE indicated in the UE Network Capability it does not support BSS packet flow procedures, then the MME shall not include the Packet Flow Id. Handover Restriction List is described in clause 4.3.5.7 "Mobility Restrictions". The MME sets the IMS Voice over PS session supported Indication as described in clause 4.3.5.8. LCS Support Indication indicates whether the network supports the EPC-MO-LR and/or CS-MO-LR as described in TS 23.271 [57].

If the UE initiates the Attach procedure at a hybrid cell, the MME shall check whether the CSG ID is contained in the CSG subscription and is not expired. The MME shall send an indication whether the UE is a CSG member to the RAN along with the S1-MME control message. Based on this information the RAN may perform differentiated treatment for CSG and non-CSG members.

If the MME or PDN GW has changed the PDN Type, an appropriate reason cause shall be returned to the UE as described in clause 5.3.1.1.

For an emergency attached UE, i.e. for UEs that have only emergency EPS bearers established, there is no AS security context information included in the S1 control messages and there is no NAS level security when the UE cannot be authenticated. The Emergency Service Support indicator informs the UE that Emergency bearer services are supported, i.e. the UE is allowed to request PDN connectivity for emergency services.

18. The eNodeB sends the RRC Connection Reconfiguration message including the EPS Radio Bearer Identity to the UE, and the Attach Accept message will be sent along to the UE. The UE shall store the QoS Negotiated, Radio Priority, Packet Flow Ed and TI, which it received in the Session Management Request, for use when accessing via GERAN or UTRAN. The APN is provided to the UE to notify it of the APN for which the activated default bearer is associated. For further details, see TS 36.331 [37]. The UE may provide EPS Bearer QoS parameters to the application handling the traffic flow(s). The application usage of the EPS Bearer QoS is implementation dependent. The UE shall not reject the RRC Connection Reconfiguration on the basis of the EPS Bearer QoS parameters contained in the Session Management Request.

If the attach procedure is initiated by manual CSG selection and occurs via a CSG cell, the UE upon receiving the Attach accept shall check if the CSG ID of the cell where the UE has sent the Attach Request message is contained in its Allowed CSG list. If the CSG ID is not in the UE's Allowed CSG list, the UE shall add the CSG ID to its Allowed CSG list. Manual CSG selection is not supported when an emergency service has been initiated.

NOTE 11: If the UE receives an Attach Accept message via a hybrid cell, the UE does not add the corresponding CSG ID to its Allowed CSG list. Adding a CSG ID to the UE's local Allowed CSG list for a hybrid cell is performed only by OTA or OMA DM procedures.

When receiving the Attach Accept message the UE shall set its TIN to "GUTI" as no ISR Activated is indicated.

If the UE receives an IPv4 address set to 0.0.0.0, it may negotiate the IPv4 address with DHCPv4 as specified in TS 29.061 [38]. If the UE receives an IPv6 interface identifier, it may wait for the Router Advertisement from the network with the IPv6 prefix information or it may send a Router Solicitation if necessary.

NOTE 12: The IP address allocation details are described in clause 5.3.1 on "IP Address Allocation".

19. The UE sends the RRC Connection Reconfiguration Complete message to the eNodeB. For further details, see TS 36331 [37].

20. The eNodeB sends the Initial Context Response message to the new MME. This Initial Context Response message includes the TEID of the eNodeB and the address of the eNodeB used for downlink traffic on the S1_U reference point. If the Correlation ID is included in the Bearer Setup Request, the eNodeB shall use the included information to establish direct user plane path with the L-GW and forward uplink data for Local IP Access accordingly.

21. The UE sends a Direct Transfer message to the eNodeB, which includes the Attach Complete (EPS Bearer Identity, NAS sequence number, NAS-MAC) message.

22. The eNodeB forwards the Attach Complete message to the new MME in an Uplink NAS Transport message.

After the Attach Accept message and once the UE has obtained a PDN Address, the UE can then send uplink packets towards the eNodeB which will then be tunnelled to the Serving GW and PDN GW. If the UE requested for a dual address PDN type (IPv4v6) to a given APN and was granted a single address PDN type (IPv4 or IPv6) by the network with a reason cause indicating that only single IP version per PDN connection is allowed sent together with the PDN type, the UE should request for the activation of a parallel PDN connection to the same APN with a single address PDN type (IPv4 or IPv6) other than the one already activated. If the UE receives no reason cause in step 18 in response to an IPv4v6 PDN type and it receives an IPv6 Interface Identifier apart from the IPv4 address or 0.0.0.0 in the PDN Address field, it considers that the request for a dual address PDN was successful. It can wait for the Router Advertisement from the network with the IPv6 prefix information or it may send Router Solicitation if necessary.

23. Upon reception of both, the Initial Context Response message in step 21 and the Attach Complete message in step 22, the new MME sends a Modify Bearer Request (EPS Bearer Identity, eNodeB address, eNodeB TEID, Handover Indication) message to the Serving GW.

23a. If the Handover Indication is included in step 23, the Serving GW sends a Modify Bearer Request (Handover Indication) message to the PDN GW to prompt the PDN GW to tunnel packets from non 3GPP IP access to 3GPP access system and immediately start routing packets to the Serving GW for the default and any dedicated EPS bearers established.

23b. The PDN GW acknowledges by sending Modify Bearer Response to the Serving GW.

24. The Serving GW acknowledges by sending Update Bearer Response (EPS Bearer Identity) message to the new MME. The Serving GW can then send its buffered downlink packets.

25. After the MME receives Modify Bearer Response (EPS Bearer Identity) message, if Request Type does not indicate handover and an EPS bearer was established and the subscription data indicates that the user is allowed to perform handover to non-3GPP accesses, and if the MME selected a PDN GW that is different from the PDN GW identity which was indicated by the HSS in the PDN subscription context, the MME shall send a Notify Request including the APN and PDN GW identity to the HSS for mobility with non-3GPP accesses. The message shall include information that identifies the PLMN in which the PDN GW is located. For an Emergency Attach the MME shall not send any Notify Request to an HSS.

26. The HSS stores the APN and PDN GW identity pair and sends a Notify Response to the MME.

NOTE 13: For handover from non-3GPP access, the PDN GW initiates resource allocation deactivation procedure in the trusted/untrusted non-3GPP IP access as specified in TS 23.402 [2].

Appendix C (Embodiment No. 2—FIG. 4)

A step-by-step discussion of the IPv6 Stateless Address Autoconfiguration Procedure described in FIG. 62 of 3GPP TS 23.060 V10.2.0 but enhanced to include a TDF Bypass Flag in step 2 (see FIG. 4) pursuant to embodiment no. 2 of the present invention is provided next. The steps are as follows:

1) The MS sends an Activate PDP Context Request message to the SGSN as defined in clause "PDP Context Activation Procedure". The MS shall leave PDP Address empty and set PDP Type to IPv6 or IPv4v6.

2) Upon reception of the Create PDP Context Request, the GGSN creates an IPv6 address composed of the prefix allocated to the PDP context and an interface identifier generated by the GGSN. This address is then returned in the PDP Address information element in the Create PDP Context Response message. The processing of the Create PDP Context Request and Create PDP Context Response, in both the SGSN and the GGSN, is otherwise as specified in clause "PDP Context Activation Procedure".

NOTE: Since the MS is considered to be alone on its link towards the GGSN, the interface identifier does not need to be unique across all PDP contexts on any APN.

3) The MS receives the IPv6 address produced by the GGSN in the Activate PDP Context Accept. The MS extracts the interface identifier from the address received and stores it. The MS shall use this interface identifier to build its link-local address and may also use it for building its full IPv6 address, as describe in step 5. The MS shall ignore the prefix contained in the address received in the Activate PDP Context Accept. The processing of the Activate PDP Context Accept is otherwise as specified in clause "PDP Context Activation Procedure".

4) The MS may send a Router Solicitation message to the GGSN to activate the sending of the Router Advertisement message.

5) The GGSN sends a Router Advertisement message. The Router Advertisement messages shall contain the same prefix as the one provided in step 2. A given prefix shall not be advertised on more than one PDP context on a given APN, or set of APNs, within the same addressing scope. The GGSN shall be configured to advertise only one prefix per PDP context.

Appendix D (Embodiment No. 2—FIG. 5)

A step-by-step discussion of the PDP Context Activation Procedure for A/Gb mode described in FIG. 63 and of the PDP Context Activation Procedure for Iu mode described in FIG. 64 of 3GPP TS 23.060 V10.2.0 but enhanced to include a TDF Bypass Flag in step 4 (see FIG. 5) pursuant to embodiment no. 2 of the present invention is provided next. The steps are as follows:

1) The MS sends an Activate PDP Context Request (NSAPI, TI, PDP Type, PDP Address, Access Point Name, QoS Requested, Protocol Configuration Options, Request Type) message to the SGSN. In this version of the protocol, the MS shall leave PDP Address empty. The MS may use Access Point Name to select a reference point to a certain packet data network and/or to select a service. Access Point Name is a logical name referring to the packet data network and/or to a service that the subscriber wishes to connect to. QoS Requested indicates the desired QoS profile. For an E-UTRAN capable UE, the QoS requested shall include interactive or background traffic class in this message. If the UE is not E-UTRAN capable, in this release the QoS requested should include interactive or background traffic class in this message. If the request is as a result of a Network-Requested PDP context activation procedure, the MS shall not set the PDP Type to IPv4v6, but to the value received in the Request PDP Context Activation message: see clause 9.2.2.2.1.

NOTE 2: In case an S4-SGSN is used in the network the QoS Requested information element shall be ignored in the network.

Protocol Configuration Options is used to transfer the NRSU and Address Allocation Preference to the GGSN and may be used to transfer the BCM as well as optional PDP parameters and/or request to the GGSN (see TS 29.060 [26] and TS 24.229 [75]). Protocol Configuration Options is sent transparently through the SGSN. NRSU indicates MS support of the network requested bearer control. The Protocol Configuration Options may include the Address Allocation Preference indicating that the MS prefers to obtain an IPv4 address only after the PDP Context Accept by means of DHCPv4 as defined in RFC 2131 [47].

If the SGSN has stored a value for the Maximum APN restriction and the value indicates the most restrictive type, then the SGSN shall reject any Activate PDP Context requests to a different APN, using the PDP Context Activation Reject message including an appropriate error cause.

If the SGSN decides to establish Direct Tunnel between RNC and GGSN, the SGSN provides to the RNC the Direct Tunnel specific parameters in step 5 "RAB Assignment Procedure" and shall initiate PDP Context Update procedure in step 8 to update IP Address and TEID for Downlink data.

Request Type indicates "Handover" when the MS has already an activated PDN GW/HA due to mobility with non-3GPP accesses, and is only interpreted by SGSNs using S4.

The PDP context activation for emergency services shall be exempted from the Maximum APN restriction control. If there is already an emergency bearer activated, the SGSN shall reject any PDP context activation request for normal services if the mobility and access restrictions do not allow the MS to access normal services.

If the message is being sent via a HNB which has a collocated L-GW, it includes the L-GW address in the Direct Transfer message to the SGSN.

2) In A/Gb mode, security functions may be executed. These procedures are defined in clause "Security Function".

3) In A/Gb mode and if BSS trace is activated, the SGSN shall send an Invoke Trace (Trace Reference, Trace Type, Trigger Id, OMC Identity) message to the BSS. Trace Reference, and Trace Type are copied from the trace information received from the HLR or OMC.

4) The SGSN validates the Activate PDP Context Request using PDP Type (optional), PDP Address (optional), and Access Point Name (optional) provided by the MS and the PDP context subscription records. The SGSN shall use the CSG Subscription Data to authorize the LIPA connection to the APN provided by the MS. A PDP Address may only be sent by an MS implemented according to an earlier protocol release. The validation criteria, the APN selection criteria, and the mapping from APN to a GGSN are described in annex A.

For an emergency PDP Context Activation the SGSN applies the parameters from SGSN Emergency Configuration Data for the emergency bearer establishment performed in this step and any potentially stored IMSI related subscription data are ignored by the SGSN.

If no GGSN address can be derived or if the SGSN has determined that the Activate PDP Context Request is not valid according to the rules described in annex A, the SGSN rejects the PDP context activation request.

If a GGSN address can be derived, the SGSN creates a TEID for the requested PDP context. If the MS requests a dynamic address, the SGSN lets a GGSN allocate the dynamic address. The SGSN may restrict the requested QoS attributes given its capabilities and the current load, and it shall restrict the requested QoS attributes according to the subscribed QoS profile.

The SGSN sends a Create PDP Context Request (PDP Type, PDP Address, Access Point Name, QoS Negotiated, Negotiated Evolved ARP, TEID, NSAPI, MSISDN, Selection Mode, Charging Characteristics, Trace Reference, Trace Type, Trigger Id, OMC Identity, Protocol Configuration Options, serving network identity, Maximum APN Restriction IMEISV, CGI/SAI, User CSG Information, RAT type, S-CDR CAMEL information, MS Info Change Reporting support indication, NRSN, Dual Address Bearer Flag, APN-AMBR) message to the affected GGSN. The Negotiated Evolved ARP IE shall contain the Subscribed Evolved ARP value. If the SGSN did not receive a Subscribed Evolved ARP value in subscription data from the HLR the SGSN shall derive this value from the Allocation/Retention Priority of the QoS profile negotiated according to Annex E in TS 23.401 [89]. The inclusion of the Negotiated Evolved ARP IE indicates that the SGSN supports the Evolved ARP feature. The SGSN shall send the serving network identity to the GGSN. Access Point Name shall be the APN Network Identifier of the APN selected according to the procedure described in Annex A. PDP Address shall be empty if a dynamic address is requested. The GGSN may use Access Point Name to find a packet data network and optionally to activate a service for this APN. Selection Mode indicates whether a subscribed APN was selected, or whether a non-subscribed APN sent by an MS or a non-subscribed APN chosen by the SGSN was selected. Selection Mode is set according to Annex A. The GGSN may use Selection Mode when deciding whether to accept or reject the PDP context activation. For example, if an APN requires subscription, the GGSN is configured to accept only the PDP context activation that requests a subscribed APN as indicated by the SGSN with Selection Mode. Charging Characteristics indicates which kind of charging the PDP context is liable for. The charging characteristics on the subscription and individually subscribed APNs as well as the way the SGSN handles Charging Characteristics and chooses to send them or not to the GGSN is defined in TS 32.251 [70]. The SGSN shall include Trace Reference, Trace Type, Trigger Id, and OMC Identity if GGSN trace is activated. The SGSN shall copy Trace Reference, Trace Type, and OMC Identity from the trace information received from the HLR or OMC. The Maximum APN Restriction denotes the most stringent restriction as required by any already active PDP contexts. If there are no already active PDP contexts, this value is set to the least restrictive type (see clause 15.4). If the GGSN receives the Maximum APN Restriction, then the GGSN shall check if the Maximum APN Restriction value does not conflict with the APN Restriction value associated with this PDP context request. If there is no conflict the request shall be allowed, otherwise the request shall be rejected with the SGSN sending a PDP Context Activation Reject Message to the MS including an appropriate error cause. NRSN indicates SGSN support of the network requested bearer control. The Dual Address Bearer Flag shall be set when the MS requests PDN type IPv4v6 and all SGSNs, which the MS may be handed over to, are Release 8 or above supporting dual addressing, which is determined based on node pre configuration by the operator.

For emergency attached UEs IMSI is included if available and if the IMSI cannot be authenticated the IMSI is included and marked as unauthenticated.

The GGSN creates a new entry in its PDP context table and generates a Charging Id. The new entry allows the GGSN to route PDP PDUs between the SGSN and the packet data network, and to start charging. The way the GGSN handles Charging Characteristics that it may have received from the SGSN is defined in TS 32.251 [70]. The GGSN may restrict QoS Negotiated given its capabilities and the current load or increase the QoS Negotiated based on any external input (e.g. policy control). The GGSN then returns a Create PDP Context Response (TEID, PDP Type, PDP Address, Protocol Configuration Options, QoS Negotiated, Negotiated Evolved ARP, Charging Id, Prohibit Payload Compression, APN Restriction, Cause, MS Info Change Reporting Action, CSG Information Reporting Action, BCM, APN-AMBR) message to the SGSN. The GGSN sets the Negotiated Evolved ARP based on local policy or PCC. The Allocation/Retention Priority of the QoS Profile Negotiated is derived from the Evolved ARP according to the mapping principles of TS 23.401 [89], Annex E. The Prohibit Payload Compression indicates that the SGSN should negotiate no data compression for this PDP context. The SGSN shall apply the Negotiated Evolved ARP if received from the GGSN. If the MS has requested PDP type IPv4v6 and both IPv4 and IPv6 addressing is possible in the PDN but the Dual Address Bearer Flag is not set, or only single IP version addressing is possible in the PDN, the GGSN selects a single IP version (either IPv4 or IPv6). If the MS has requested PDP type IPv4 or IPv6, the GGSN uses the PDP type supplied by the MS in case it is supported in the PDN, otherwise an appropriate error cause will be returned. The GGSN allocates a PDP Address according to the selected PDP type. If the GGSN has selected a PDN type different from the one sent by the MS, the GGSN indicates, together with the PDP type IE, a reason cause to the MS why the PDP type has been modified as described in clause 9.2.1. PDP Address is included if the GGSN allocated a PDP address. If the GGSN has been configured by the operator to use External PDN Address Allocation for the requested APN, PDP Address shall be set to 0.0.0.0, indicating that the PDP address shall be negotiated by the MS with the external PDN after completion of the PDP Context Activation procedure. The GGSN shall relay, modify and monitor these negotiations as long as the PDP context is in ACTIVE state, and use the GGSN-initiated PDP Context Modification procedure to transfer the currently used PDP address to the SGSN and the MS. However, the MS cannot rely on always getting a session management level update of the IP address, which it has negotiated with the external PDN. This is because the P-GW does not update the IP address within the EPS bearer modification procedure, see clause 9.2.3.2A. Protocol Configuration Options contains the BCM as well as optional PDP parameters that the GGSN may transfer to the MS. BCM shall also be sent as a separate IE to the SGSN. These optional PDP parameters may be requested by the MS in the Activate PDP Context Request message, or may be sent unsolicited by the GGSN. Protocol Configuration Options is sent transparently through the SGSN. The Create PDP Context messages are sent over the backbone network. The BCM is used by the SGSN to handle unexpected session management signalling.

If QoS Negotiated received from the SGSN is incompatible with the PDP context being activated, the GGSN rejects the Create PDP Context Request message. The GGSN operator configures the compatible QoS profiles.

If an APN Restriction is received from the GGSN for this PDP Context, then the SGSN shall store this value for the PDP Context and the SGSN shall check this received value with the stored value for the Maximum APN Restriction to ensure there are no conflicts between values. If the consequence of this check results in the PDP context being rejected, the SGSN shall initiate a PDP Context Deactivation and return an appropriate error cause. If the PDP Context is accepted, it shall determine a (new) value for the Maximum APN Restriction. If there is no previously stored value for Maximum APN Restriction, then the Maximum APN Restriction shall be set to the value of the received APN Restriction.

The emergency PDP context activation shall be exempted from the Maximum APN restriction control.

If the MS Info Change Reporting Action and/or the CSG Information Reporting Action are received from the GGSN for this PDP context, then the SGSN shall store this for the PDP context and the SGSN shall report to that GGSN whenever a CGI/SAI/RAI or user CSG information change occurs that meets the GGSN request, as described in clause 15.1.1a.

The GGSN derives the BCM based on NRSU, NRSN and operator policy if previously received in the Create PDP Context Request message. The derived BCM is sent to the MS indicating the Bearer Control Mode applicable to all PDP Contexts within the activated PDP Address/APN pair.

The SGSN shall re-verify and may restrict the QoS Negotiated received in the response from the GGSN against the subscribed QoS profile and additionally restrict the QoS negotiated based on its capabilities and current load. The SGSN shall use this updated QoS Negotiated for the subsequent steps.

The SGSN shall apply a Negotiated Evolved ARP even if it is different from the Subscribed Evolved ARP.

The SGSN determines the UE AMBR to be used by the RAN based on the subscribed UE-AMBR and the APN AMBR for active APNs, see clause 15.2.2.

5) In Iu mode, RAB setup is done by the RAB Assignment procedure, see clause "RAB Assignment Procedure".

6) In Iu mode and if BSS trace is activated, the SGSN shall send an Invoke Trace (Trace Reference, Trace Type, Trigger Id, OMC Identity) message to the RAN. Trace Reference, and Trace Type are copied from the trace information received from the HLR or OMC.

NOTE 3: Step 6 is applied when the trace activation is triggered by means of signalling. Another alternative is the triggering of trace activation by the OMC. The details of both Trace Activation procedures are described in TS 32.422 [84].

7) In A/Gb mode, BSS packet flow context procedures may be executed. These procedures are defined in clause "BSS Context".

8) In case the QoS attributes, used as input to step 5 for Iu mode or step 7 for A/Gb mode, have been downgraded during those steps, the SGSN may inform the GGSN about the downgraded QoS attributes by sending an Update PDP Context Request to the affected GGSN. The GGSN shall not attempt to renegotiate the QoS attributes. The No QoS negotiation indication is set in Update PDP Context Request to indicate to the GGSN that the SGSN does not upgrade the previously negotiated QoS attributes and that the GGSN shall accept the provided QoS attributes without negotiation. The GGSN confirms the new QoS attributes by sending an Update PDP Context Response to the SGSN. If the SGSN established Direct Tunnel in step 5 it shall send Update PDP Context Request and include the RNC's Address for User Plane, TEID for downlink data, No QoS negotiation indication and the DTI. DTI is used to instruct the GGSN to apply Direct Tunnel specific error handling as described in clause 13.8. The GGSN(s) shall not include a PCO in the Update PDP Context Response if the No QoS negotiation indication is set.

9) The SGSN inserts the NSAPI along with the GGSN address in its PDP context. The PDP address received from the GGSN or from HSS subscription records is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, Protocol Configuration Options) message to the MS. If the MS indicated in the MS Network Capability it does not support BSS packet flow procedures, then the SGSN shall not include the Packet Flow Id. In A/Gb mode, the QoS Negotiated shall take into account the Aggregate BSS QoS Profile, if any, returned from the BSS. Protocol Configuration Options are used to transfer the BCM to the UE and may be used to transfer optional PDP parameters to the UE (see TS 29.060 [26] and TS 24.229 [75]). Protocol Configuration Options is sent transparently through the SGSN. The BCM indicates the Bearer Control Mode applicable to all PDP Contexts within the activated PDP Address/APN pair. If the BCM parameter is not included in the message then the MS shall set the Bearer Control Mode to 'MS_Only' for the PDP Address/APN pair (see clause 9.2). The SGSN is now able to route PDP PDUs between the GGSN and the MS, and to start charging.

If the MS is incapable of accepting the new QoS Negotiated, the MS should initiate application level signalling to lower the QoS requirements for the concerned application(s). If this is not possible then the MS shall instead de-activate the PDP context with the PDP Context Deactivation Initiated by the MS procedure.

The invention claimed is:

1. A network node that participates in an Internet Protocol-Connectivity Access Network (IP-CAN) session establishment within a telecommunications network, the network node comprising:
   at least one processor; and,
   at least one memory that stores processor-executable instructions, wherein the at least one processor interfaces with the at least one memory to execute the processor-executable instructions, whereby said network node is operable to:
   receive a user privacy policy of an end user, wherein the user privacy policy indicates whether or not data flows to and from a user equipment used by the end user are to be routed through a traffic detection function (TDF) node; and
   utilize the user privacy policy during the IP-CAN session establishment to assign an IP address to the end user, wherein the assigned IP address ensures that the data flows to and from the user equipment are one of routed and not routed through a TDF node depending on the user privacy policy.

2. The network node of claim 1, further operable to:
   ensure the data flows to and from the user equipment are routed through the same TDF node when the user privacy policy indicates that the data flows to and from the user equipment are to be routed through a TDF node.

3. The network node of claim 1, wherein the user privacy policy is received from a Home Subscriber Server (HSS) or an Authentication Authorization Accounting Server (AAA), and wherein the user privacy policy indicates whether the end user is to be assigned an IP address which is associated with an Access Point Name (APN) or a separate IP address pool in which no TDF node is deployed or is associated with another APN or a separate IP address pool in which a TDF node is deployed.

4. The network node of claim 1, further operable to:
   partition an Access Point Name (APN) into separate IP address pools where one IP address pool has IP addresses that bypass a TDF node and another IP address pool has IP addresses that do not bypass a TDF node; and
   assign an IP address to the end user from one of the separate IP address pools to enforce the user privacy policy, wherein the assigned IP address is a source IP address which ensures that the data flows are one of routed and not routed through a TDF node depending on the user privacy policy.

5. The network node of claim 1, wherein the user privacy policy is received from a Policy and Charging Rules Function (PCRF), and wherein the user privacy policy points to a particular service Access Point Name (APN) which either has a TDF node deployed in a path or does not have a TDF node deployed in the path depending on the user privacy policy.

6. The network node of claim 1, wherein the user privacy policy is received from a Policy and Charging Rules Function (PCRF), and wherein the user privacy policy defines and points to a set of local predefined Policy and Charging Enforcement Function (PCEF) configuration data to be used for IP address allocation/IP configuration and subsequent routing with respect to a TDF node.

7. The network node of claim 1, wherein the user privacy policy is received from a Policy and Charging Rules Function (PCRF), and wherein the user privacy policy provides a TDF bypass indication.

8. The network node of claim 1, wherein the user privacy policy is received from a Policy and Charging Rules Function (PCRF), and wherein the user privacy policy has a permit unrestricted indicator which is used when a TDF node cannot be bypassed, and wherein the permit unrestricted indicator indicates that a TDF node is to bypass enforcement actions on the data flows to and from the user equipment.

9. The network node of claim 1, wherein the user privacy policy is conveyed by an access-accept message which is received from a Policy and Charging Rules Function (PCRF) which acted as a Radius or Diameter proxy and interfaced with an Authentication Authorization Accounting Server (AAA), and wherein the access-accept message indicates an Access Point Name (APN) which is to be used when assigning the IP address to ensure that the data flows to and from the user equipment are one of routed and not routed through a TDF node depending on the user privacy policy.

10. The network node of claim 1, wherein the user privacy policy is conveyed by an access-accept message which is received from a Policy and Charging Rules Function (PCRF) which acted as a Radius or Diameter proxy and interfaced with an Authentication Authorization Accounting Server (AAA), and wherein the access-accept message indicates a local IP pool which is to be used when assigning the IP address to ensure that the data flows to and from the user equipment are one of routed and not routed through a TDF node depending on the user privacy policy.

11. A method implemented by a network node that participates in an Internet Protocol-Connectivity Access Network (IP-CAN) session establishment within a telecommunications network, the method comprising the steps of:
receiving, by the network node, a user privacy policy of an end user, wherein the user privacy policy indicates whether or not data flows to and from a user equipment used by the end user are to be routed through a traffic detection function (TDF) node; and
utilizing, by the network node, the user privacy policy during the IP-CAN session establishment to assign an IP address to the end user, wherein the assigned IP address ensures that the data flows to and from the user equipment are one of routed and not routed through a TDF node depending on the user privacy policy.

12. The method of claim 11, further comprising the step of ensuring, by the network node, the data flows to and from the user equipment are routed through the same TDF node when the user privacy policy indicates that the data flows to and from the user equipment are to be routed through a TDF node.

13. The method of claim 11, wherein the user privacy policy is received from a Home Subscriber Server (HSS) or an Authentication Authorization Accounting Server (AAA), and wherein the user privacy policy indicates whether the end user is to be assigned an IP address which is associated with an Access Point Name (APN) or a separate IP address pool in which no TDF node is deployed or is associated with another APN or a separate IP address pool in which a TDF node is deployed.

14. The method of claim 11, further comprising the steps of:
partitioning, by the network node, an Access Point Name (APN) into separate IP address pools where one IP address pool has IP addresses that bypass a TDF node and another IP address pool has IP addresses that do not bypass a TDF node; and
assigning, by the network node, an IP address to the end user from one of the separate IP address pools to enforce the user privacy policy, wherein the assigned IP address is a source IP address which ensures that the data flows are one of routed and not routed through a TDF node depending on the user privacy policy.

15. The method of claim 11, wherein the user privacy policy is received from a Policy and Charging Rules Function (PCRF), and wherein the user privacy policy points to a particular service Access Point Name (APN) which either has a TDF node deployed in a path or does not have a TDF node deployed in the path depending on the user privacy policy.

16. The method of claim 11, wherein the user privacy policy is received from a Policy and Charging Rules Function (PCRF), and wherein the user privacy policy defines and points to a set of local predefined Policy and Charging Enforcement Function (PCEF) configuration data to be used for IP address allocation/IP configuration and subsequent routing with respect to a TDF node.

17. The method of claim 11, wherein the user privacy policy is received from a Policy and Charging Rules Function (PCRF), and wherein the user privacy policy provides a TDF bypass indication.

18. The method of claim 11, wherein the user privacy policy is received from a Policy and Charging Rules Function (PCRF), and wherein the user privacy policy has a permit unrestricted indicator which is used when a TDF node cannot be bypassed, and wherein the permit unrestricted indicator indicates that a TDF node is to bypass enforcement actions on the data flows to and from the user equipment.

19. The method of claim 11, wherein the user privacy policy is conveyed by an access-accept message which is received from a Policy and Charging Rules Function (PCRF) which acted as a Radius or Diameter proxy and interfaced with an Authentication Authorization Accounting Server (AAA), and wherein the access-accept message indicates an Access Point Name (APN) which is to be used when assigning the IP address to ensure that the data flows to and from the user equipment are one of routed and not routed through a TDF node depending on the user privacy policy.

20. The method of claim 11, wherein the user privacy policy is conveyed by an access-accept message which is received from a Policy and Charging Rules Function (PCRF) which acted as a Radius or Diameter proxy and interfaced with an Authentication Authorization Accounting Server (AAA), and wherein the access-accept message indicates a local IP pool which is to be used when assigning the IP address to ensure that the data flows to and from the user equipment are one of routed and not routed through a TDF node depending on the user privacy policy.

21. A network node that participates in an Internet Protocol-Connectivity Access Network (IP-CAN) session establishment within a telecommunications network, the network node comprising:
at least one processor; and,
at least one memory that stores processor-executable instructions, wherein the at least one processor interfaces with the at least one memory to execute the processor-executable instructions, whereby said network node is operable to:
receive a request for IP-CAN bearer establishment of an user equipment;
send an indication of IP-CAN session establishment to a Policy and Charging Rules Function (PCRF), wherein the PCRF interfaces with a Subscription Profile Repository (SPR) to obtain subscriber related information including a user privacy policy which indicates whether or not data flows to and from the user equipment are to be routed through a traffic detection function (TDF) node; and
receive an acknowledgment message from the PCRF, wherein the acknowledgment message includes a configuration option profile which is dependent upon the user privacy policy and defines and points to a set of local predefined Policy and Charging Enforcement Function (PCEF) configuration to be used for IP address allocation and subsequent routing of the data flows to and from the user equipment.

22. The network node of claim 21, wherein the network node is a gateway-Policy and Charging Enforcement Function (PCEF).

23. A method implemented by a network node that participates in an Internet Protocol-Connectivity Access Network (IP-CAN) session establishment within a telecommunications network, the method comprising the steps of:
- receiving, by the network node, a request for IP-CAN bearer establishment of an user equipment;
- sending, by the network node, an indication of IP-CAN session establishment to a Policy and Charging Rules Function (PCRF), wherein the PCRF interfaces with a Subscription Profile Repository (SPR) to obtain subscriber related information including a user privacy policy which indicates whether or not data flows to and from the user equipment are to be routed through a traffic detection function (TDF) node; and
- receiving, by the network node, an acknowledgment message from the PCRF, wherein the acknowledgment message includes a configuration option profile which is dependent upon the user privacy policy and defines and points to a set of local predefined Policy and Charging Enforcement Function (PCEF) configuration to be used for IP address allocation and subsequent routing of the data flows to and from the user equipment.

24. The method of claim 23, wherein the network node is a gateway-Policy and Charging Enforcement Function (PCEF).

25. A gateway implementing a Policy and Charging Enforcement Function (GW-PCEF) that participates in an Internet Protocol-Connectivity Access Network (IP-CAN) session establishment within a telecommunications network, the GW-PCEF comprising:
- a processor; and
- a memory that stores processor-executable instructions where the processor interfaces with the memory and executes the processor-executable instructions to perform operations as follows:
  - receive a user privacy policy of an end user, wherein the user privacy policy indicates whether or not data flows to and from a user equipment used by the end user are to be routed through a traffic detection function (TDF) node; and
  - utilize the user privacy policy during the IP-CAN session establishment to assign an Internet Protocol (IP) address to the end user, wherein the assigned IP address ensures that the data flows to and from the user equipment are one of routed and not routed through a TDF node depending on the user privacy policy.

* * * * *